US009423485B2

(12) United States Patent
Li et al.

(10) Patent No.: US 9,423,485 B2
(45) Date of Patent: Aug. 23, 2016

(54) SYSTEMS AND METHODS FOR PREDICTING AN EXPECTED BLOCKAGE OF A SIGNAL PATH OF AN ULTRASOUND SIGNAL

(71) Applicant: QUALCOMM Incorporated, San Diego, CA (US)

(72) Inventors: Ren Li, San Diego, CA (US); Hui-ya L. Nelson, San Diego, CA (US); Joseph R. Fitzgerald, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 709 days.

(21) Appl. No.: 13/712,159

(22) Filed: Dec. 12, 2012

(65) Prior Publication Data

US 2013/0155816 A1    Jun. 20, 2013

Related U.S. Application Data

(60) Provisional application No. 61/576,893, filed on Dec. 16, 2011.

(51) Int. Cl.
  *G01S 3/80* (2006.01)
  *G06F 3/041* (2006.01)
  *G06F 3/043* (2006.01)

(52) U.S. Cl.
  CPC . *G01S 3/80* (2013.01); *G06F 3/043* (2013.01); *G06F 3/0418* (2013.01); *G06F 3/0433* (2013.01)

(58) Field of Classification Search
  CPC ........................................... G01S 11/00
  See application file for complete search history.

(56) References Cited

U.S. PATENT DOCUMENTS

| 6,454,714 | B1 | 9/2002 | Ng et al. |
|---|---|---|---|
| 6,633,280 | B1 | 10/2003 | Matsumoto et al. |
| 7,218,040 | B2 | 5/2007 | Toda |
| 7,843,859 | B1 | 11/2010 | Gregorian et al. |
| 7,852,318 | B2 | 12/2010 | Altman |
| 2005/0054931 | A1 | 3/2005 | Clark |
| 2006/0098810 | A1 | 5/2006 | Kim |
| 2008/0309641 | A1 | 12/2008 | Harel et al. |

(Continued)

FOREIGN PATENT DOCUMENTS

| EP | 1862889 A2 | 12/2007 |
|---|---|---|
| JP | 8044487 | 2/1996 |
| JP | 2001142639 | 5/2001 |

(Continued)

OTHER PUBLICATIONS

International Search Report and Written Opinion for International application No. PCT/US2012/069382 mailed Apr. 2, 2013, 13 pages.

*Primary Examiner* — Luke Ratcliffe
(74) *Attorney, Agent, or Firm* — Toler Law Group, PC

(57) ABSTRACT

A method includes detecting a signal at a first set of receivers of a plurality of receivers of a device. The plurality of receivers includes the first set of receivers and a second set of receivers. The first set of receivers corresponds to selected receivers and the second set of receivers corresponds to non-selected receivers. The method includes predicting, based on the signal, an expected blockage of a signal path between a source of the signal and a first selected receiver of the first set of receivers, and selecting a particular receiver of the second set of receivers as a newly selected receiver in response to predicting the expected blockage.

41 Claims, 23 Drawing Sheets

(56) References Cited

U.S. PATENT DOCUMENTS

2010/0208907 A1 8/2010 Ukai et al.
2011/0115748 A1* 5/2011 Xu ........................ G06F 3/0421
345/175

FOREIGN PATENT DOCUMENTS

| JP | 2001142640 | 5/2001 | |
| WO | 2005111653 A2 | 11/2005 | |
| WO | WO2005/111653 * | 11/2005 | .............. G01S 11/00 |

* cited by examiner

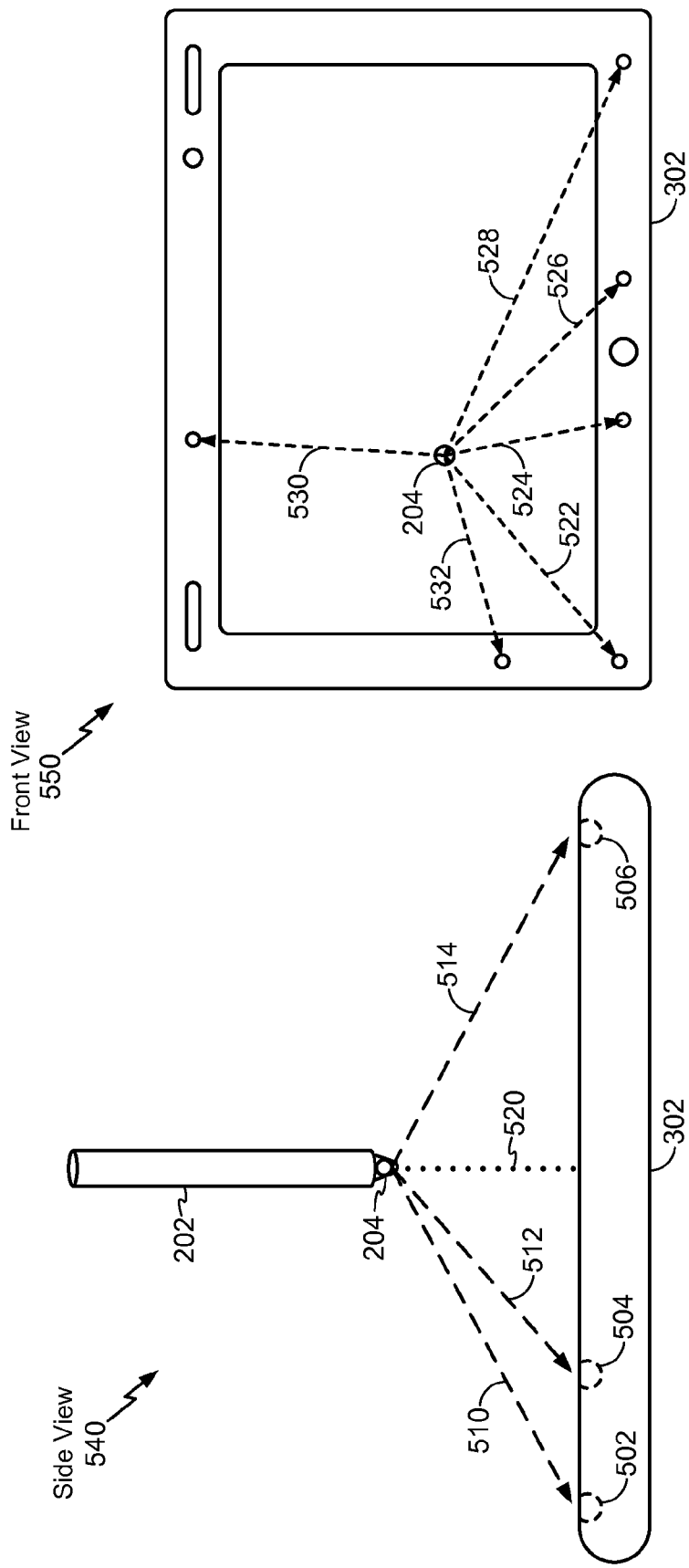

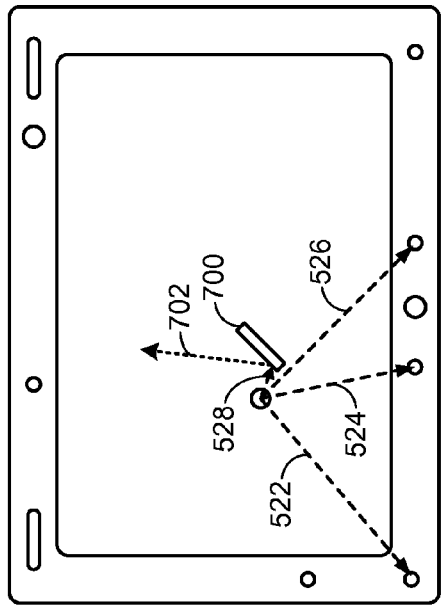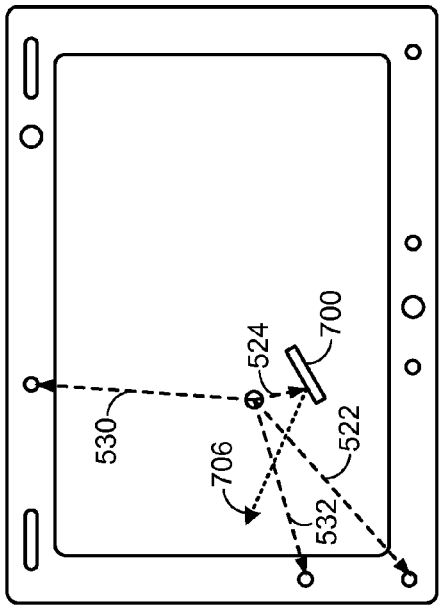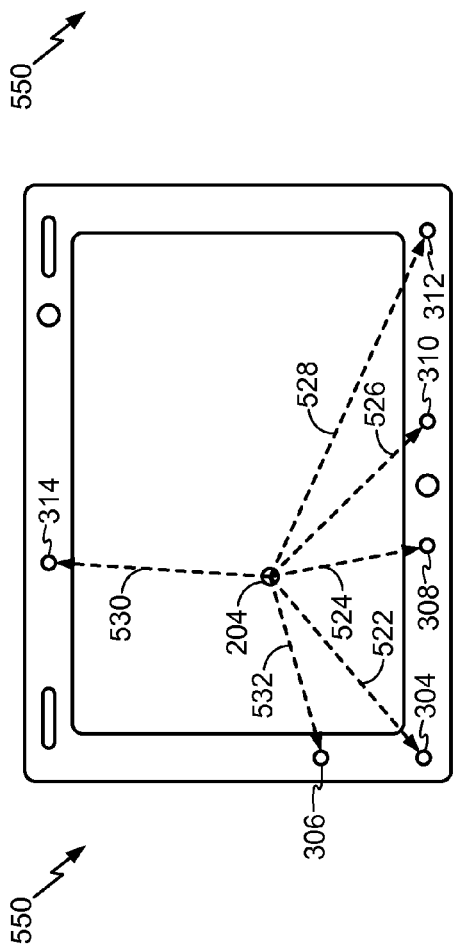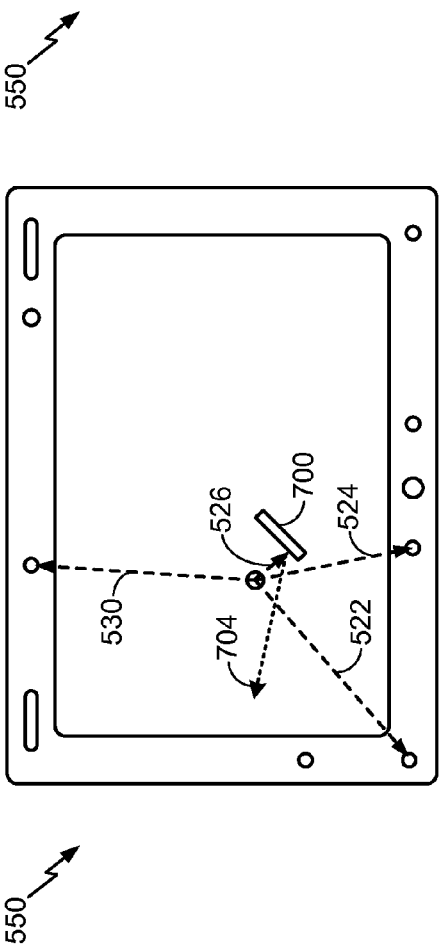

| Use Case | Blockage Detection Mechanism (BDM) Type | | | BDM Operation | | Mode |
|---|---|---|---|---|---|---|
| • Non-pen<br>• Pen<br>• Tablet | SNR | DLL or PLL | Combination of SNR, DLL or PLL | All Receivers Powered | Only Selected Receivers Powered | • Concurrency<br>• Normal<br>• Quadmic |

FIG. 10

| Use | Mode | BDM Operation | RCVR5 | RCVR4 | RCVR3 | RCVR2 | RCVR1 | Configuration | Predicted Receiver Option | BDM Type |
|---|---|---|---|---|---|---|---|---|---|---|
| Pen | Normal | Only Selected Mics On | 0 | 0 | 1 | 1 | 1 | 1 | 4 or 5 | SNR |
| | | | 0 | 1 | 1 | 0 | 1 | 2 | 2 or 5 | |
| | | | 1 | 0 | 1 | 0 | 1 | 3 | 2 or 4 | |
| | | | 0 | 1 | 0 | 1 | 1 | 4 | 3 or 5 | |
| | | | 1 | 1 | 0 | 1 | 1 | 5 | 3 or 4 | |
| | | | 0 | 0 | 1 | 1 | 0 | 6 | 1 or 5 | |
| | | | 1 | 1 | 1 | 0 | 0 | 7 | 1 or 4 | |
| | | | 1 | 1 | 0 | 0 | 1 | 8 | 1 or 2 | |
| | | | 1 | 1 | 0 | 1 | 1 | 9 | 2 or 3 | |
| | | | 1 | 1 | 1 | 1 | 0 | 10 | 1 or 3 | |

FIG. 12

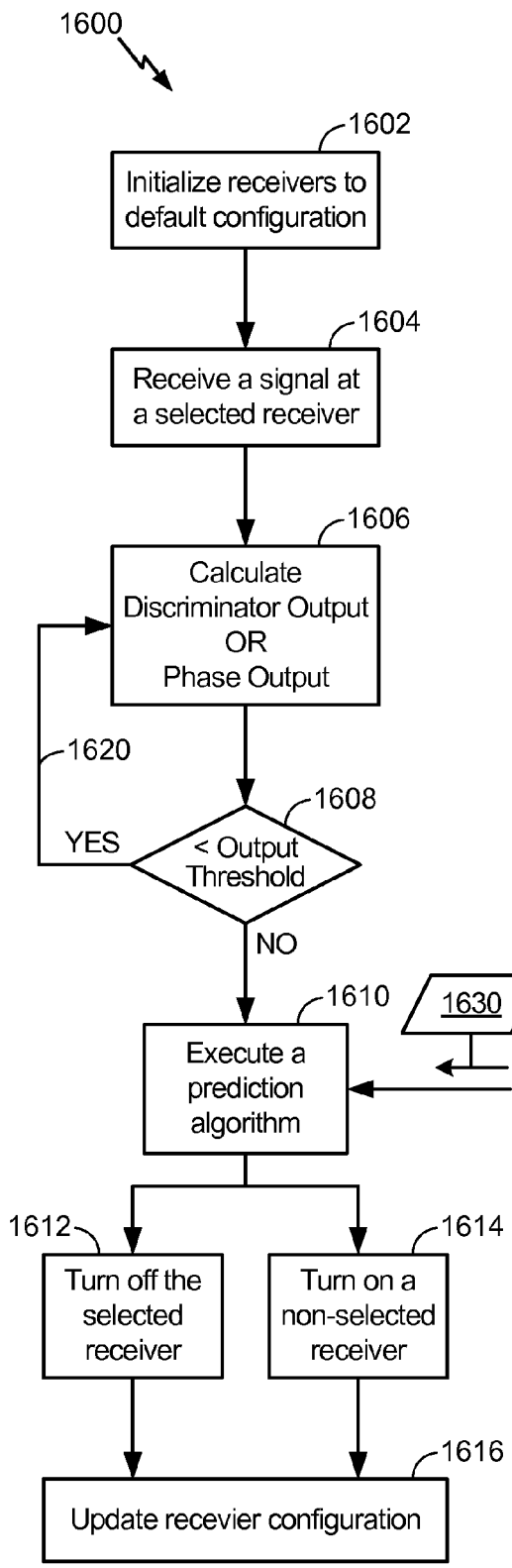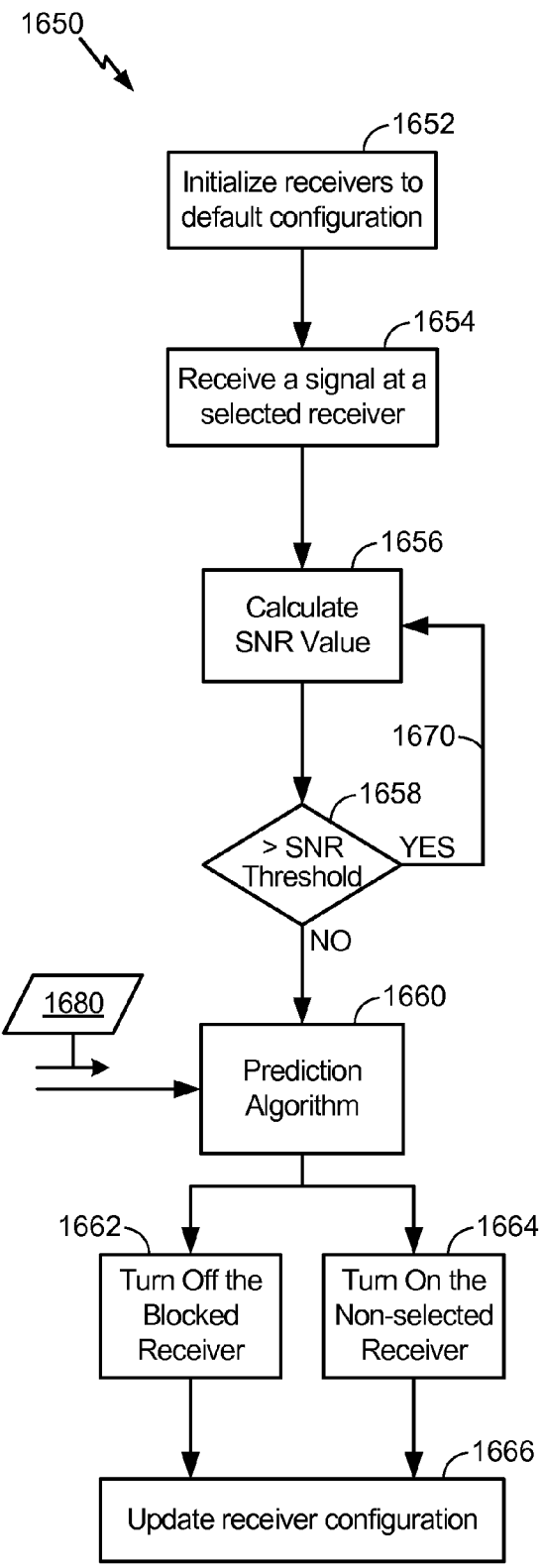
*FIG. 16A*     *FIG. 16B*

US 9,423,485 B2

SYSTEMS AND METHODS FOR PREDICTING AN EXPECTED BLOCKAGE OF A SIGNAL PATH OF AN ULTRASOUND SIGNAL

CLAIM OF PRIORITY

This application claims priority from U.S. provisional application No. 61/576,893 filed on Dec. 16, 2011 and entitled "Systems and Methods for Predicting an Expected Blockage of a Signal Path of an Ultrasound Signal," the contents of which are expressly incorporate herein by reference.

FIELD OF THE DISCLOSURE

The present disclosure is generally related to ultrasound transmitter and receiving systems.

BACKGROUND

Time difference of arrival (TDOA) can be used to determine the location of an object relative to a tablet or other computing device. For example, a pen (e.g., a stylus) may include a transmitter configured to transmit an ultrasound signal. The ultrasound signal may be detected by receivers (e.g., microphones) on the tablet. Timing differences between signals received at different receivers can be used to detect position and movement of the pen (based on how long it took the ultrasound signal to travel from the pen to the microphones).

Ultrasound signal energy decays faster than audio band signal energy and may require line of sight (LOS) between transmitters and receivers. Systems that use an ultrasound transmitter and at least one receiver may not properly determine the location of the pen when a LOS signal path between the transmitter and the at least one receiver is blocked. For example, when a user is using the pen, his or her hand or another object can block the signal path between the pen and a receiver. One approach to avoid the blocking problem is to have many redundant receivers operating at the same time. This approach uses more power due to having all receivers (e.g., microphones) powered at the same time and consumes more bandwidth between a hardware codec and a system processor.

BRIEF DESCRIPTION OF THE DRAWINGS

FIGS. 5A and 5B illustrate another embodiment of a system for predicting an expected blockage of a signal path of an ultrasound signal;

FIGS. 7A, 7B, 7C, and 7D illustrate another embodiment of a system for predicting an expected blockage of a signal path of an ultrasound signal;

FIG. 10 is a table illustrating various prediction algorithm input values;

FIG. 12 is a portion of a lookup table for use with a prediction algorithm;

FIG. 16A is a flowchart of a method of providing power to selected receivers based on an output of a blockage detection mechanism (BDM) including a delay locked loop (DLL) or a phase locked loop (PLL);

FIG. 16B is a flowchart of a method of providing power to selected receivers based on an output of a blockage detection mechanism (BDM) configured to generate a signal to noise ratio (SNR) value;

DETAILED DESCRIPTION

A system, method, and apparatus to locate an object are disclosed. The system and apparatus include a plurality of receivers configured to receive a signal from a transmitter. The system and apparatus include logic (e.g., circuitry) to determine a location of the object based on signals received at selected receivers (e.g., a first set of receivers) of the plurality of receivers. The system and apparatus are operable to predict an expected blockage of a signal path between the object and at least one of the selected receivers. The system and apparatus are operable to select a receiver from among the non-blocked receivers (e.g., a second set of receivers) in response to predicting the expected blockage. In a particular embodiment, a method of selecting a non-selected receiver of a device is disclosed. The method includes detecting a signal at selected receivers of the device. The device includes at least one non-selected receiver. The method includes predicting, based on the signal, an expected blockage of a signal path between a source of the signal and a first selected receiver. The method further includes selecting a second receiver from among the at least one non-selected receiver in response to predicting the expected blockage.

In another embodiment, a system is configured to select a non-selected receiver of a device. The system includes a plurality of receivers, a processor, and a memory. The plurality of receivers includes selected receivers (e.g., a first set of receivers) and at least one non-selected receiver (e.g., a second set of receivers). The memory may store instructions executable by the processor. The instructions may be executable by the processor to detect a signal at each of the selected receivers. The instructions may be further executable by the processor to predict, based on the signal, an expected blockage of a signal path between a source of the signal and a first selected receiver. The instructions may be further executable by the processor to select at least one of the non-selected receivers in response to predicting the expected blockage of the signal path.

Figure 1:
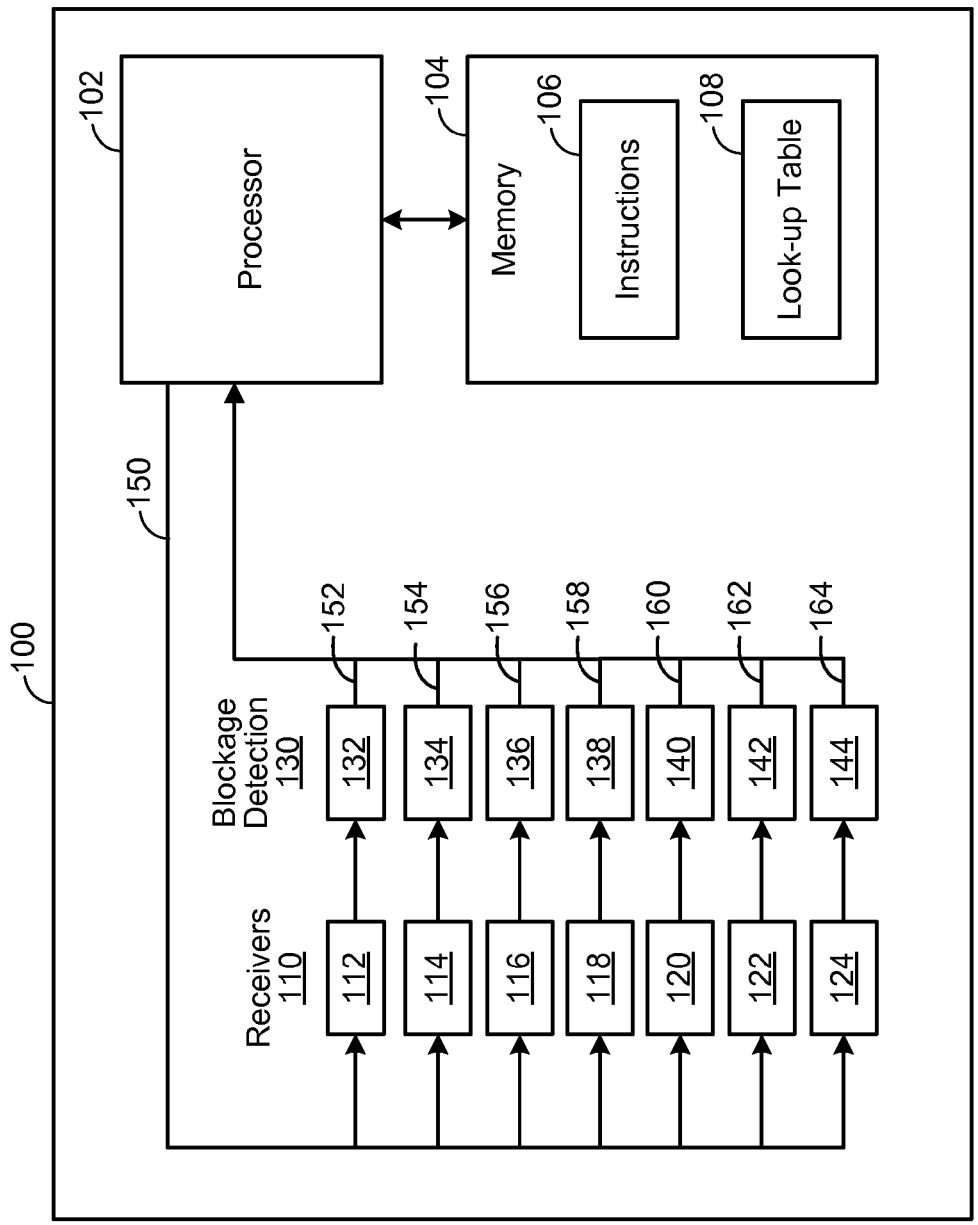
FIG. 1 is a block diagram of an illustrative embodiment of a system for predicting an expected blockage of a signal path of an ultrasound signal.

Referring to FIG. 1, an illustrative embodiment of a device 100 is shown. The device 100 includes a processor 102, a memory 104, and a plurality of receivers 110. The device 100 may be a tablet, a personal computing device, a laptop computing device, a wireless communication device, a personal digital assistant (PDA), another computing device, or any combination thereof. In an embodiment, the plurality of receivers 110 are arranged about one or more surfaces of the device 100, as described further with reference to FIGS. 3A and 3B. In an embodiment, the plurality of receivers 110 comprises a plurality of microphones. At least one microphone of the plurality of microphones may be configured to detect an ultrasound signal (e.g., an acoustic signal having a frequency in excess of twenty (20) kiloHertz (kHz)). In a particular embodiment, one or more of the microphones may be configured to detect the ultrasound signal and an audio signal (e.g., an acoustic signal having a frequency between twenty (20) Hertz (Hz) and twenty (20) kHz). In a particular embodiment, the ultrasound signal may correspond to an acoustic signal that is outside of a human auditory range (i.e., signals having a frequency in excess of twenty (20) kHz) and the audio signal may correspond to an acoustic signal that is within the human auditory range (e.g., signals having a frequency between twenty (20) Hertz (Hz) and twenty (20) kHz).

As shown in FIG. 1, the processor 102, or another component of the device 100, may generate or otherwise communicate a clock signal 150 to the plurality of receivers 110. The plurality of receivers 110 may synchronize to the clock signal 150. The clock signal 150 may be synchronized to a clock external to the device 100. By synchronizing the clock signal 150 with the clock external to the device 100, the processor 102 may determine a location of a device transmitting a signal using time difference of arrival.

The plurality of receivers 110 includes selected receivers (e.g., a first set of receivers) and non-selected receivers (e.g., a second set of receivers). The selected receivers correspond to a first set of receivers of the plurality of receivers 110 that are to be used by the processor 102 when determining the location of the device transmitting the signal. The non-selected receivers may correspond to a second set of receivers of the plurality of receivers 110 that are not to be used by the processor 102 when determining the location of the device transmitting the signal. In an embodiment, each of the plurality of receivers 110 may be activated (e.g., receiving power) and may receive the signal from the transmitter. In this embodiment, the signals received at the selected receivers may be used by the processor 102 to determine the location of the device transmitting the signal and the signals received at the non-selected receivers may not be used by the processor 102. In an alternative embodiment, the selected receivers may be activated (e.g., receiving power) and may receive the signal from the device. In this embodiment, the non-selected receivers may be deactivated (e.g., not receiving power) and may not receive the signal from the device.

As shown in FIG. 1, the memory 104 includes instructions 106. The instructions 106 may include instructions executable by the processor 102 to detect a signal at the selected receivers (e.g., the first set of receivers) of the plurality of receivers 110. The instructions 106 may further include instructions executable by the processor 102 to predict, based on the signal, an expected blockage of a signal path between a source of the signal and a first selected receiver. The instructions 106 may further include instructions executable by the processor 102 to select a second selected receiver from among the at least one non-selected receiver (e.g., the second set of receivers) of the plurality of receivers 110 in response to predicting the expected blockage of the signal path between the source of the signal and the first selected receiver.

The instructions 106 may include instructions to de-select the first selected receiver in response to selecting the at least one non-selected receiver. De-selecting the first selected receiver may include designating the first selected receiver as a non-selected receiver (e.g., as included in the second set of receivers) due to the predicted blockage of the signal path between the source of the signal and the first selected receiver. When the first selected receiver is de-selected, the first selected receiver becomes a first non-selected receiver and is not used by the processor 102 to determine the location of the device transmitting the signal. In a particular embodiment, when the selected receivers are activated (e.g., receiving power) and the non-selected receivers are deactivated (e.g., not receiving power), the instructions to de-select the first selected receiver may be executable by the processor 102 to cause the device 100 to deactivate (i.e., no longer provide power to) the de-selected receiver (i.e., the first non-selected receiver).

As shown in FIG. 1, each of the plurality of receivers 110 is coupled to a blockage detection mechanism (BDM) 130. For example, in FIG. 1 a first receiver 112 is coupled to a first BDM 132, a second receiver 114 is coupled to a second BDM 134, a third receiver 116 is coupled to a third BDM 136, a fourth receiver 118 is coupled to a fourth BDM 138, a fifth receiver 120 is coupled to a fifth BDM 140, a sixth receiver 122 is coupled to a sixth BDM 142, and a seventh receiver 124 is coupled to a seventh BDM 144. Each of the BDMs 130 may be configured to generate an output (e.g., outputs 152-164) that may be used by the processor 102 to predict an expected blockage of a signal path between a source of the signal and one or more of the plurality of receivers 110. In a particular embodiment, the clock signal 150 may be provided to each of the BDMs 130 rather than to the plurality of receivers 110. In another particular embodiment, the clock signal 150 may be provided to each of the BDMs 130 and the plurality of receivers 110.

Figure 20:
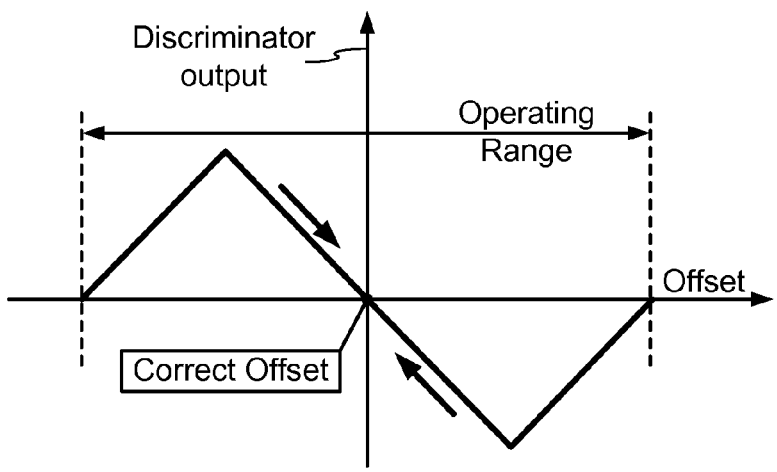
FIG. 20 illustrates an example of an output of the DLL of FIG. 19.
Figure 21:
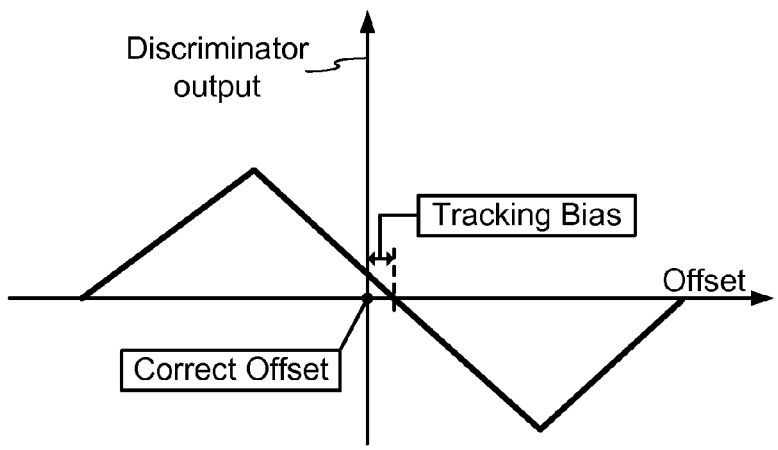
FIG. 21 illustrates another example of an output of the DLL of FIG. 19.

In an embodiment, each of the BDMs 130 includes a delay locked loop (DLL) and the processor 102 may determine whether the signal path is blocked based on a discriminator output of each of the DLLs. To illustrate, a transmitter may transmit a signal (e.g., an ultrasound signal) capable of being received or otherwise detected by a first selected receiver (e.g., the first receiver 112). The signal may be detected by the first selected receiver (e.g., the first receiver 112) and provided as an input to a DLL (e.g., a DLL within the first BDM 132) coupled to the first selected receiver. When a signal path between the transmitter and the first selected receiver is unobstructed (i.e., there is a direct line of sight (LOS) between the transmitter and the first selected receiver), a discriminator output of the DLL may be zero, as shown in FIG. 20. When the signal path between the transmitter and the first selected receiver is at least partially blocked, the DLL (e.g., the DLL within the first BDM 132) may attempt to track a multipath signal instead of the direct LOS signal. The multipath signal may cause a tracking bias in the discriminator output of the DLL, as shown in FIG. 21. The tracking bias may cause the discriminator output of the DLL to be non-zero. An exemplary DLL suitable for use in the device 100 is described with reference to FIG. 19.

The output of the BDMs 130 may be used by the processor 102 to predict the expected blockage of the signal path between the source of the signal and the first selected receiver. For example, each of the BDMs 130 corresponding to a selected receiver (e.g., a receiver of the first set of receivers) may provide an output (e.g., a discriminator output of a DLL) to the processor 102. The processor 102 may predict an expected blockage of a signal path between a source of the signal and one or more selected receivers (e.g., one or more of the first set of receivers) of the plurality of receivers 110 based on the outputs received from the BDMs 130 that correspond to the one or more selected receivers. The processor 102 may determine whether to de-select one or more of the selected receivers based on the prediction, and may determine whether to select one of the non-selected receivers (e.g., a receiver of the second set of receivers) for use in determining the location of the device transmitting the signal.

In another embodiment, each of the BDMs 130 includes a phase locked loop and the processor 102 may determine whether a signal path between a source of a signal and a first selected receiver is blocked based on an output of the PLL. For example, when the signal path is not blocked, an output of the PLL may be zero. When the signal path is at least partially blocked, the PLL may attempt to track a multipath signal. The multipath signal may cause loop stress that in turn causes the output of the PLL to be non-zero. The loop stress may also be referred to as a static phase error. An exemplary PLL may include a phase detector that includes a discriminator and other elements (e.g., a multiplier, a voltage controlled oscillator (VCO), etc.) to generate a change of phase output instead of a change in time output. The output of each of the PLLs (e.g., a PLL within each of the BDMs 130) corresponds to a phase difference between the signal received at a selected receiver and the VCO may be provided to the processor 102. In a particular embodiment, the output of the PLL may indicate a phase difference between the clock signal 150 and a clock signal associated with the signal received at the selected receiver. The processor 102 may predict an expected blockage of a signal path between a source of the signal and one or more of the selected receivers (e.g., the first set of receivers) based on the received phase outputs. In an embodiment, when the phase output of a particular PLL (i.e., a particular one of the BDMs 130) is zero, the prediction may indicate that a selected receiver coupled to the particular PLL is not expected to be blocked. In this embodiment, when the phase output of the particular PLL is non-zero, the prediction may indicate an expected blockage of the selected receiver coupled to the particular PLL. The processor 102 determines whether to de-select one or more of the selected receivers (e.g., one or more of the first set of receivers) based on the prediction, and determines whether to select one of the non-selected receivers (e.g., a receiver of the second set of receivers) to for use in determining the location of the device transmitting the signal.

In yet another embodiment, each of the BDMs 130 may generate an output that indicates a signal to noise ratio (SNR). Each of the BDMs 130 may determine the SNR based on a ratio of a receiver signal to receiver noise at a particular one of the plurality of receivers, a ratio of a phase of the signal to the phase noise of the signal, a ratio of the phase of the signal to the phase noise of a PLL, a ratio of the PLL output to the phase noise of the PLL, another ratio, or a combination of ratios. The processor 102 may determine whether a signal path between the source of the signal and a first selected receiver is blocked based on the output. For example, the processor 102 may compare an SNR value indicated by the output of each of the BDMs 130 to a threshold value. When the SNR value associated with a particular selected receiver is greater than the threshold value, the processor 102 may predict that the signal path is not blocked (i.e., there is direct line of sight (LOS) along a signal path between the source of the signal and the particular selected receiver). When the SNR value associated with the particular selected receiver is less than the threshold value, the processor 102 may predict that the signal path is at least partially blocked (i.e., there is not direct LOS). The processor 102 may determine whether to de-select one or more of the selected receivers (e.g., one or more of the first set of receivers) based on the prediction, and may determine whether to select one of the non-selected receivers (e.g., one of the second set of receivers) for use in determining the location of the device transmitting the signal.

In an embodiment, at least one of the plurality of receivers 110 is a non-selected receiver and may not receive power. In this embodiment, at least one of the BDMs 130 corresponding to the at least one non-selected receiver may not receive power. By not providing power to the non-selected receivers (e.g., the second set of receivers) and the BDMs corresponding to the non-selected receivers, energy usage of the device 100 may be reduced relative to embodiments where the device 100 provides power to each of the plurality of receivers 110 irrespective of which of the plurality of receivers 110 are selected for use in determining the location of the device transmitting the signal.

For example, as shown in Table 1, in a first configuration (e.g., CONFIG-1), receivers 112, 116, 122, and 124 may be selected receivers (e.g., a first set of receivers) and receivers 114, 118, and 120 may be non-selected receivers (e.g., a second set of receivers). The selected receivers 112, 116, 122, 124 may detect a signal. Each of the selected receivers 112, 116, 122, 124 provides a received signal to a BDM coupled to the selected receiver. For example, the first receiver 112 may provide a signal to the first BDM 132, the third receiver 116 may provide a signal to the third BDM 136, the sixth receiver 122 may provide a signal to the sixth BDM 142, and the seventh receiver 124 may provide a signal to the seventh BDM 144. Outputs of the BDMs 132, 136, 142, 144 may be provided to the processor 102. The processor 102 may predict an expected blockage of a signal path between a source of the signal and one of the selected receivers 112, 116, 122, 124. For example, if the outputs of the BDMs 132, 136, 142, 144 have values of 0, 0.3, 0, and 0 respectively, the processor 102 may predict an expected blockage of the signal path between the source of the signal and the third receiver 116.

TABLE 1

Sample configuration data stored in the look-up table 108

| Configuration # | Selected Receivers | Non-Selected Receivers |
|---|---|---|
| CONFIG-1 | 112, 116, 122, 124 | 114, 118, 120 |
| CONFIG-2 | 112, 120, 122, 124 | 114, 116, 118 |
| CONFIG-3 | 112, 116, 120, 124 | 114, 118, 122 |
| CONFIG-4 | 116, 120, 122, 124 | 112, 114, 118 |
| CONFIG-5 | 112, 114, 116, 122 | 118, 120, 124 |
| CONFIG-6 | 112, 114, 120, 122 | 116, 118, 124 |
| CONFIG-7 | 112, 114, 116, 120 | 118, 122, 124 |
| CONFIG-8 | 114, 116, 120, 122 | 112, 118, 124 |
| CONFIG-9 | 112, 114, 116, 124 | 118, 120, 122 |

In response to predicting an expected blockage of a signal path between the source of the signal and the third receiver 116, the processor 102 may select at least one of the non-selected receivers (e.g., one of the second set of receivers) for use in determining the location of the device transmitting the signal. For example, the processor 102 may select one of the receivers 114, 118, 120. Additionally, in response to predicting the expected blockage of the selected receiver, the processor 102 may de-select the selected receiver (e.g., the third receiver 116).

In a particular embodiment, the processor 102 may select one of the non-selected receivers (e.g., one of the second set of receivers) by determining whether a signal path between the source of the signal and a particular non-selected receiver is blocked. In an embodiment, the processor 102 may cause the device 100 to activate (e.g., provide power to) the non-selected receiver prior to determining whether the signal path is blocked. In an embodiment, when the processor 102 de-selects a selected receiver, the processor 102 may cause the device 100 to deactivate (e.g., stop providing power to) the de-selected receiver.

In another embodiment, the processor 102 may retrieve data from a look-up table 108 to determine which of the non-selected receivers (e.g., one of the non-selected receivers 114, 118, 120) to select. The look-up table 108 may store data identifying a current configuration of the receivers 112-124. For example, each of the receivers 112-124 may be selected (e.g., included in the first set of receivers) or non-selected (e.g., included in the second set of receivers). In a particular embodiment, when a receiver (e.g., the first receiver 112) is selected, the receiver is listening for a signal (e.g., an ultrasound signal). In this particular embodiment, when a receiver (e.g., the second receiver 114) is non-selected, the receiver is not listening for the signal and may not be used by the processor 102 to determine a location of the device transmitting the signal.

In an exemplary embodiment, the data in Table 1 may be stored in the look-up table 108. In response to predicting the expected blockage of the third receiver 116, the processor 102 may retrieve data from the look-up table 108 (e.g., the data in Table 1). The data may indicate that a current selected receiver configuration is CONFIG-1 of Table 1. In response to predicting the expected blockage of the signal path between the source of the signal and the third receiver 116, the processor 102 may identify CONFIG-2 as a next selected receiver configuration. By switching from CONFIG-1 to CONFIG-2, the third receiver 116 (i.e., the receiver predicted to be blocked) is de-selected and becomes a non-selected receiver and the fifth receiver 120 is selected and becomes a selected receiver. The processor 102 may store information identifying a current selected receiver configuration (e.g., CONFIG-2 of Table 1) in the look-up table 108. By selecting only a subset of the plurality of receivers 110, the device 100 achieves more efficient power and resource consumption. Additionally, by predicting a blockage of a signal path to a first selected receiver, the processor 102 is able to select a non-selected receiver as a second selected receiver prior to the blockage of the signal path between the source of the signal and the first selected receiver. The signal path between the source of the signal and the second selected receiver may not be blocked, and the signal is not lost.

In an embodiment, each time the device 100 is powered on, all of the receivers 112-124 are selected receivers. Each of the receivers 112-124 may receive a signal and provide data associated with the received signal to the processor 102. The processor 102 may receive the data and determine whether to de-select one or more of the receivers 112-124. The processor 102 may store configuration information identifying which of the receivers 112-124 are selected receivers (e.g., a first set of receivers) and which of the receivers 112-124 are non-selected receivers (e.g., a second set of receivers) in the look-up table 108 of the memory 104.

In another embodiment, each time the device 100 is powered on, the processor 102 may retrieve a default configuration from the look-up table 108. The default configuration may identify a default state (i.e., selected or non-selected) for each of the receivers 112-124. In response to retrieving the default configuration information, the processor 102 may select a subset of the receivers 112-124 as selected receivers (e.g., a first set of receivers) based on the default configuration information. For example, the default configuration may indicate that the receivers 112-118 are to be selected receivers and that the receivers 120-124 are to be non-selected receivers (e.g., a second set of receivers). After each of the receivers 112-124 is placed in the state identified by the default configuration, the selected receivers may listen for signals (e.g., ultrasound signals). As the selected receivers detect and process the signals, information associated with the signals is provided to the processor 102. The processor 102 may modify a state (i.e., select and/or de-select) of one or more of the receivers 112-124 based on the information associated with the signals. For example, the processor 102 may select a first receiver that was previously a non-selected receiver in response to predicting an expected blockage of one of the selected receivers. The processor 102 may de-select the selected receiver that was predicted to be blocked.

In the particular embodiment illustrated in FIG. 1, the device 100 includes seven receivers (e.g., the receivers 112-124). In other embodiments, the device may include more than or fewer than seven receivers. In an embodiment, each of the receivers 112-124 is operable to detect an ultrasound signal transmitted from an ultrasound transmitter. In another embodiment, a first group of the receivers 112-124 is operable to detect and process ultrasound signals and a second group of the receivers 112-124 is operable to detect and process analog or other audio signals (e.g., voice signals). In yet another illustrative embodiment, a first group of the receivers 112-124 may be dedicated to detecting and processing ultrasound signals, a second group of the receivers 112-124 may be dedicated to detecting and processing analog signals (e.g., voice signals), and a third group of the receivers 112-124 may be operable to detect and process both ultrasound signals and analog or audio signals (e.g., voice signals). In a particular embodiment, the plurality of receivers 112-124 includes at least one receiver (e.g., a microphone) that is configured to detect acoustic signals (e.g., ultrasound signals) outside of a human auditory range and to detect acoustic signals (e.g., audio signals) within the human auditory range. In a particular embodiment, the ultrasound signal may correspond to an acoustic signal that is outside of a human auditory range (i.e., signals having a frequency in excess of twenty (20) kHz) and the analog or audio signal may correspond to an acoustic signal that is within the human auditory range (e.g., signals having a frequency between twenty (20) Hertz (Hz) and twenty (20) kHz).

In an embodiment, the signals may be used by the processor 102 to determine a position of an object relative to the device 100. While not shown in FIG. 1, the signals received at the selected receivers (e.g., the first set of receivers) may be provided to the processor 102. Additionally, the BDM 130 outputs 152-164 may be provided to a system clock of the device 100 in order to synchronize the clock signal 150 with another clock signal associated with the signals received at the selected receivers. When the system clock of the device 100 is synchronized with the other clock signal, the processor 102 may use the signals received at the selected receivers to determine the position of the object using time difference of arrival (TDOA).

Figure 2:
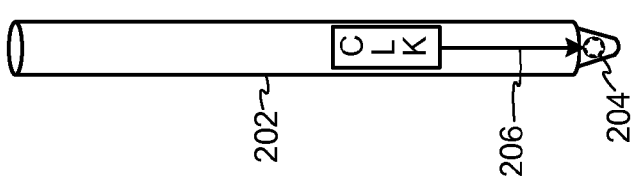
FIG. 2 is diagram of an embodiment of a ultrasonic stylus pen.

Referring to FIG. 2, an illustrative embodiment of a stylus pen 202 suitable for use with the device 100 is shown. The stylus pen 202 includes a transmitter 204. In a particular embodiment, the transmitter 204 is an ultrasound transmitter. The transmitter 204 transmits a signal responsive to a clock signal 206. The clock signal 206 may be generated by a clock (CLK) within the stylus pen 202. For example, the transmitter 204 may transmit a signal including data determined based on the clock signal 206. The signal may be detected by a selected receiver of the device 100. The signal may be processed (e.g., by a BDM corresponding to the selected receiver) as described with reference to FIG. 1 and the processed signal may be used by the processor 102 in calculating the position of the stylus pen 202 relative to the device 100. The processor 102 may calculate the position of the stylus pen 202 using time difference of arrival (TDOA).

Figure 3A:
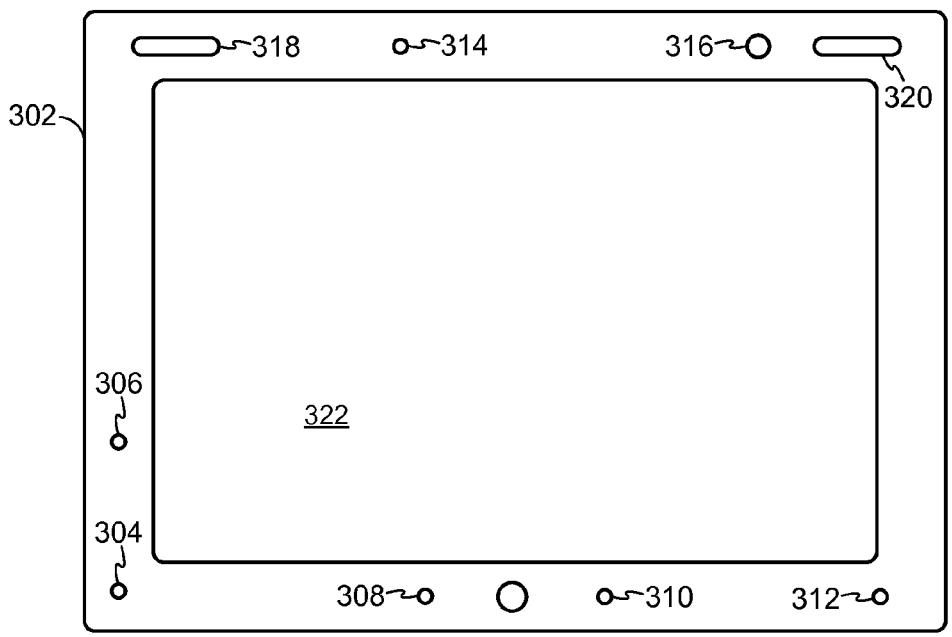
FIGS. 3A and 3B illustrate an embodiment of a system for predicting an expected blockage of a signal path of an ultrasound signal.
Figure 3B:
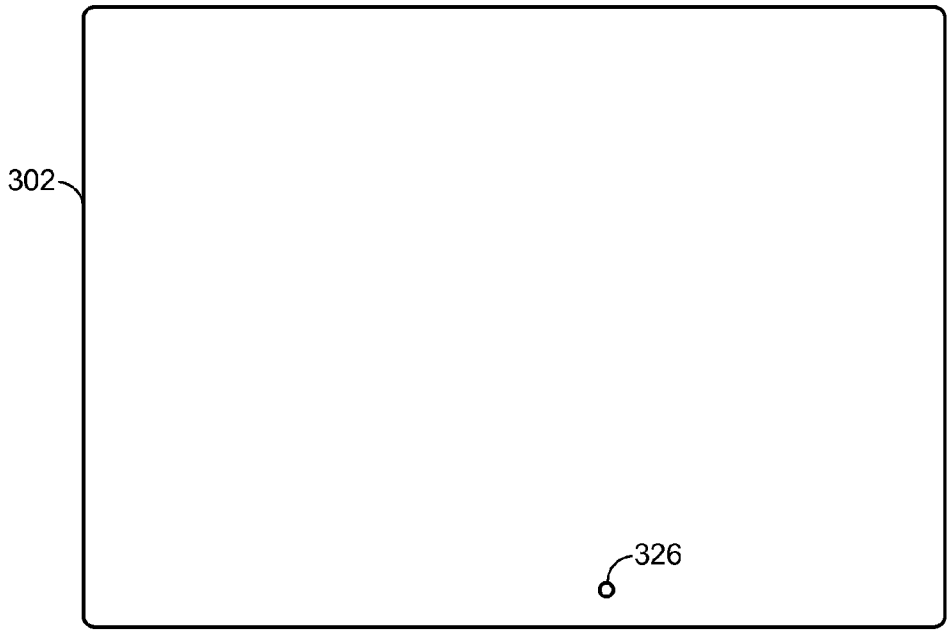

Referring to FIGS. 3A and 3B, an illustrative embodiment of an apparatus 302 is shown. In FIG. 3A, a front view 300 of the apparatus 302 is shown. In FIG. 3B, a rear view 324 of the apparatus 302 is shown. In an illustrative embodiment, the apparatus 302 may be a tablet computer, a laptop computer, a wireless communication device, another computing device, or any combination thereof. For example, the apparatus 302 may correspond to the device 100 of FIG. 1. The apparatus 302 includes a plurality of receivers 304, 306, 308, 310, 312, 314, 326. The apparatus 302 may include a transmitter 316. Additionally, the apparatus 302 may include speakers 318, 320 and a display screen 322. The plurality of receivers 304, 306, 308, 310, 312, 314, 326 may be operable to receive a signal. In an embodiment, one or more of the plurality of receivers 304, 306, 308, 310, 312, 314, 326 may be a microphone. In another embodiment, one or more of the receivers 304, 306, 308, 310, 312, 314, 326 may be a transducer. Each of the plurality of receivers 304, 306, 308, 310, 312, 314, 326 may be configured to receive an audio signal (e.g., voice), an ultrasound signal, or any combination thereof.

In the embodiment illustrated in FIGS. 3A and 3B, the apparatus 302 includes seven receivers. In other embodiments, the apparatus 302 includes at least three receivers, at least four receivers, or another number of receivers. The apparatus 302 may be configured to select some of the receivers 304, 306, 308, 310, 312, 314, 326. For example, the apparatus 302 may include a processor (e.g., the processor 102) configured to predict an expected blockage of a signal path between a source of a signal (e.g., the transmitter 204) and a selected receiver (e.g., a receiver of a first set of receivers). The processor of the apparatus 302 may predict the expected blockage based on input received from blockage detection mechanisms (BDMs) as described with reference to FIG. 1. In response to predicting the expected blockage of the selected receiver, the apparatus 302 may predict whether a signal path between the source of the signal and a non-selected receiver (e.g., a receiver of a second set of receivers) is expected to be blocked. If the signal path between the source of the signal and the non-selected receiver is not predicted to be blocked, the apparatus 302 may de-select the selected receiver and select the non-selected receiver. By dynamically selecting a subset of the receivers 304, 306, 308, 310, 312, 314, 326 for use in determining the position of the device transmitting the signal, the apparatus 302 may consume less power than if all the receivers 304, 306, 308, 310, 312, 314, 326 were used to determine the position of the device transmitting the signal.

Figure 4:
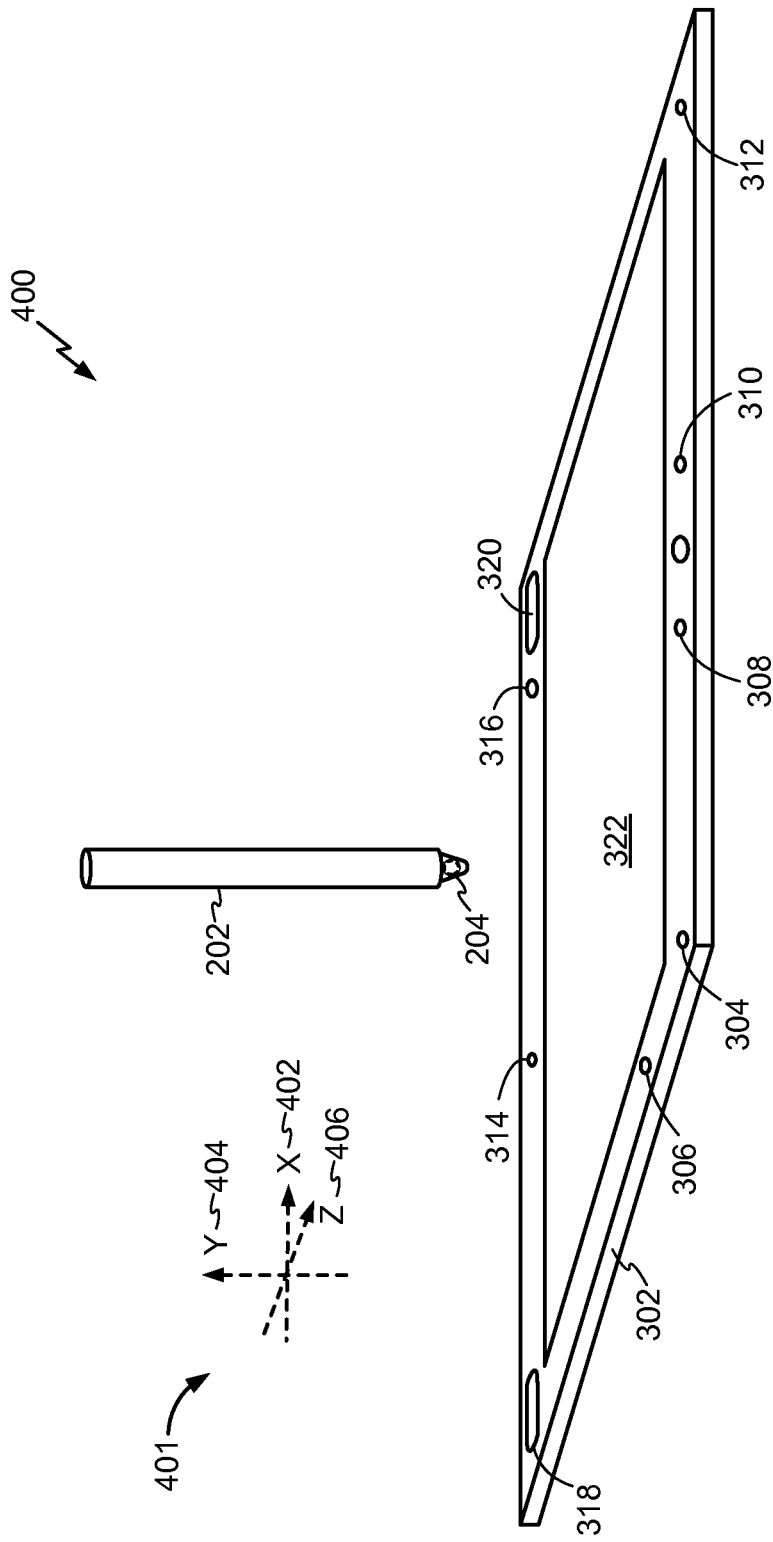
FIG. 4 illustrates another embodiment of a system for predicting an expected blockage of a signal path of an ultrasound signal.

Referring to FIG. 4, a system 400 is shown. A coordinate system 401 is illustrated and includes an x-axis 402, a y-axis 404, and a z-axis 406. In an illustrative embodiment, the stylus pen 202 may communicate with the apparatus 302 using a signal emitted from the transmitter 204. For example, the stylus pen 202 may be used to write on the display screen 322 of the apparatus 302. As another example, the stylus pen 202 may be used to select an icon (not shown) that is displayed on the display screen 322 of the apparatus 302. The apparatus 302 may determine a location of the stylus pen 202 based on signals received by the receivers 304, 306, 308, 310, 312, 314, 326, or a subset of the receivers 304, 306, 308, 310, 312, 314 from the transmitter 204 of the stylus pen 202.

The apparatus 302 may be configured to determine a 2-dimensional (2D) location of the stylus pen 202 within a plane of the display screen 322. For example, an icon displayed on the display screen 322 may be selected using the stylus pen 202 by tapping the stylus pen 202 on a portion of the display screen 322 corresponding to the icon. In an illustrative embodiment, the apparatus 302 may maintain at least three of the receivers 304, 306, 308, 310, 312, 314 as selected receivers for use in determining the 2D location of the stylus pen 202.

As another illustrative example, the apparatus 302 may determine the 3-dimensional (3D) location of the stylus pen 202 in relation to the apparatus 302 (e.g., a location with reference to the x-axis 402, the y-axis 404, and the z-axis 406). For example, the icon displayed on the display screen 322 may be selected by placing the stylus pen 202 within a threshold distance (e.g., a distance along the y-axis 404 above the plane of the x-axis 402 and the z-axis 406) of the portion of the display screen 322 corresponding to the icon. In an illustrative embodiment, the apparatus 302 may maintain at least four of the receivers 304, 306, 308, 310, 312, 314 as selected receivers for use in determining the 3D location of the stylus pen 202.

Referring to FIG. 5A, an illustrative embodiment of a side view 540 of the apparatus 302 is shown. As shown in FIG. 5A, the apparatus 302 includes receivers 502, 504, and 506. Receiver 502 may correspond to the receivers 304, 308, 310, and 312 of FIG. 3A (as seen from the side view 540). Receiver 504 may correspond to the receiver 306 of FIG. 3A, and receiver 506 may correspond to receiver 314 of FIG. 3A. Receiver 326 of FIG. 3B is not shown for simplicity of illustration.

As shown in FIG. 5A, the transmitter 204 of the stylus pen 202 may transmit a signal that may travel along a plurality of signal paths 510, 512, 514 to the receivers 502, 504, 506. The stylus pen 202, and in particular the transmitter 204, may be located at a distance 520 from the apparatus 302. The distance 520, as illustrated in FIG. 5A, may correspond to a distance in the direction of the y-axis 404 of FIG. 4.

Referring to FIG. 5B, a front view 550 of the apparatus 302 is shown. The front view 550 of FIG. 5B illustrates the plurality of signal paths 510, 512, 514 of FIG. 5A. In FIG. 5B, the plurality of signal paths 522, 524, 526, 528 may correspond to the signal path 510. A signal emitted from the transmitter 204 may propagate along the signal paths 522, 524, 526, 528 and may be received at the receivers 304, 308, 310, 312 of the apparatus 302. The signal path 532 may correspond to the signal path 512. A signal emitted from the transmitter 204 may propagate along the signal path 532 and may be received at the receiver 306. The signal path 530 may correspond to the signal path 514. A signal emitted from the transmitter 204 may propagate along the signal path 530 and may be received at the receiver 314. In an embodiment, the signal may originate at the transmitter 204 of the stylus pen 202. In an alternative embodiment, the signal may originate at the transmitter 316 of the apparatus 302 and may be reflected by the stylus pen 202. The reflected signal may propagate along the signal paths 522-532.

Figure 6A:
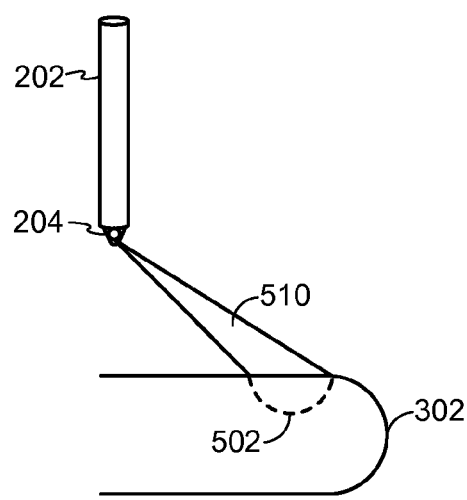
FIGS. 6A, 6B, and 6C illustrate another embodiment of a system for use in detecting blocking of an ultrasound signal.

Referring to FIG. 6A, an illustrative example of receiving a signal from the transmitter 204 is shown. As shown in FIG. 6A, the transmitter 204 of the stylus pen 202 may transmit a signal that travels along the signal path 510 and is received at a particular receiver of the receivers 502. The particular receiver of the receivers 502 is a selected receiver. In FIG. 6A, the signal path 510 is an unobstructed path to the particular receiver of the receivers 502.

Figure 6B:
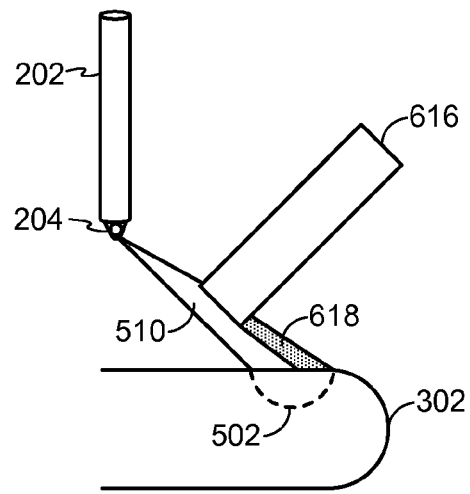

Referring to FIG. 6B, another illustrative example of receiving a signal from the transmitter 204 is shown. As shown in FIG. 6B, the transmitter 204 of the stylus pen 202 may transmit a signal that propagates along the signal path 510 and is received at a particular receiver of the receivers 502. The particular receiver of the receivers 502 is a selected receiver. In FIG. 6B, a blocking object 616 is shown. The blocking object 616 may block or obstruct a portion 618 of the signal path 510 as a result of movement of the blocking object 616, as a result of movement of the transmitter 204, or both. A strength of the signal received by the receiver 502 in FIG. 6B may be less than a strength of the signal received at the particular receiver of the receivers 502 in FIG. 6A due to the blocking object 616 blocking the portion 618 of the signal path 510.

The particular receiver of the receivers 502 illustrated in FIG. 6B may be coupled to a blockage detection mechanism (BDM) configured to generate an output based on the signal received at the particular receiver. The output may be provided to a processor (not shown) of the device 302 and may be used by the processor to predict an expected blockage of the signal path 510 as described with reference to FIG. 1. In a particular embodiment, the BDM coupled to the particular receiver may generate an output indicating a signal to noise ratio (SNR) value of the signal received at the particular receiver. In another embodiment, the BDM may include a delay locked loop (DLL) or a phase locked loop (PLL) and an output of the DLL or PLL may be used by the processor to predict an expected blockage of the signal path 510, as described with reference to FIG. 1. In yet another embodiment, the BDM may generate an output that includes information associated with an SNR value and information associated with an output of a DLL or a PLL. The processor may predict an expected blockage of the signal path 510 based on the information associated with the SNR value and based on the information associated with the output of the DLL or the PLL, as described with reference to FIG. 1.

Figure 6C:
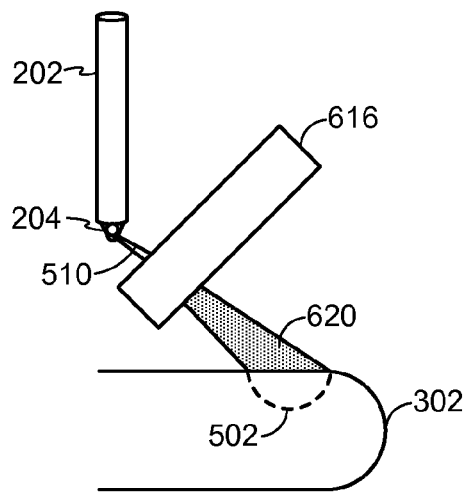

Referring to FIG. 6C, another illustrative example of receiving a signal from the transmitter 204 is shown. As shown in FIG. 6C, the transmitter 204 of the stylus pen 202 may transmit a signal that travels along a portion of the signal path 510. In FIG. 6C, the blocking object 616 is shown. The blocking object 616 is blocking a second portion 620 of the signal path 510. As shown in FIG. 6C, the second portion 620 indicates that substantially the entire signal is blocked from reaching the particular receiver of the receivers 502 via the signal path 510. Thus, the strength of the signal may be too weak to be detected at the particular receiver and the signal may be lost, which may prevent the apparatus 302 from accurately determining a location of the source of the signal (e.g., the transmitter 204).

The apparatus 302 may be operable to predict the expected blockage of the second portion 620 of the signal path 510 prior to losing the signal. For example, the apparatus 302 may detect that the portion 618 of the signal path 510 has been blocked or obstructed by the blocking object 616, as shown in FIG. 6B. In response to detecting that the portion 618 of the signal path 510 has been blocked, the apparatus 302 may predict the expected blockage of the second portion 620 of the signal path 510. In response to predicting the expected blockage of the second portion 620 of the signal path 510, the apparatus 302 may select a non-selected receiver prior to the blocking object 616 blocking the second portion 620 of the signal path 510. By selecting a non-selected receiver capable of receiving the signal along a signal path that is not predicted to be blocked or otherwise obstructed, the apparatus 302 may prevent the loss of the signal that would otherwise occur when the blocking object 616 blocks the second portion 620. Thus, the apparatus 302 is able to maintain a sufficient number of selected receivers to determine a location of a source of the signal and select a non-selected receiver in response to a predicted blockage of a selected receiver.

Referring to FIG. 7A, the front view 550 of FIG. 5B is shown. The front view 550 of FIG. 7A illustrates the plurality of signal paths 522-532 of FIG. 5B. As shown in FIG. 7A, a signal originating at the transmitter 204 of the stylus pen 202 may propagate along the plurality of signals paths 522-532 to the receivers 304, 306, 308, 310, 312, 314. Alternatively, a signal originating at another source may be reflected by the stylus pen 202 and the reflected signal may propagate along the signals paths 522-532. As explained with reference to FIG. 1, the apparatus 302 may maintain only some of the receivers 304-314 as selected receivers (e.g., a first set of receivers) and others of the receivers 304-314 as non-selected receivers (e.g., a second set of receivers). FIG. 7A illustrates the signal paths 522-532 along which the signal may propagate. The signal may be received at the selected receivers while the non-selected receivers may not receive the signal. As shown in FIG. 7A, a first receiver 304, when selected, receives the signal via a first signal path 522, a second receiver 306, when selected, receives the signal via a second signal path 532, a third receiver 308, when selected, receives the signal via a third signal path 524, a fourth receiver 310, when selected, receives the signal via a fourth signal path 526, a fifth receiver 312, when selected, receives the signal via a fifth signal path 528, and a sixth receiver 314, when selected, receives the signal via a sixth signal path 530.

Referring to FIG. 7B, an illustrative embodiment of the front view 550 of the apparatus 302 is shown. In FIG. 7B, the receivers 304-314 are configured according to a particular receiver configuration corresponding to CONFIG-1 of Table 1. The receivers 112-124 of Table 1 may correspond to the receivers 304-314 of FIGS. 3A and 7A. For example, the first receiver 112 may correspond to the first receiver 304, the second receiver 114 may correspond to the second receiver 306, the third receiver 116 may correspond to the third receiver 312, the fourth receiver 122 may correspond to the fourth receiver 308, the fifth receiver 120 may correspond to the fifth receiver 314, the sixth receiver 124 may correspond to the sixth receiver 310, and the seventh receiver 118 may correspond to a seventh receiver (not shown in the front view 550) that corresponds to the seventh receiver 326 of FIG. 3B. As described with reference to Table 1, CONFIG-1 indicates that the receivers 304, 308, 310, 312 are selected receivers (e.g., a first set of receivers) and that the receivers 306, 314, 326 are non-selected (e.g., a second set of receivers). Accordingly, the selected receivers 304, 308, 310, 312 may be receiving the signal that propagates along corresponding signal paths 522, 524, 526, 528. The signal paths 530, 532 are not shown in FIG. 7B because non-selected receivers 306, 314 are not receiving the signal.

As illustrated in FIG. 7B, a blocking object 700 may block or otherwise obstruct at least a portion of one of the signal paths, such as the signal path 528. For example, at a first time the blocking object 700 may be blocking only a portion of the signal path 528 as illustrated by the portion 618 of FIG. 6B. The blocking object 700 may cause a change in value output by a BDM coupled to the receiver 312. A processor (e.g., the processor 102) may predict an expected blockage of the signal path 528 based on the value output by the BDM coupled to the receiver 312. The processor may select a non-selected receiver (e.g., one of the non-selected receivers 306, 314) for use in determining a location of a device transmitting the signal in response to predicting the expected blockage of the signal path 528.

For example, in response to predicting an expected blockage of the signal propagating along signal path 528, the processor may determine that the sixth receiver 314 (e.g., corresponding to the fifth receiver 120 of Table 1) should be selected (i.e., included in the first set of receivers) and that the fifth receiver 312 (e.g., corresponding to the third receiver 116 of Table 1) should be de-selected (i.e., included in the second set of receivers). In an embodiment, the processor may determine that the sixth receiver 314 should be selected by performing a look-up using data retrieved from a look-up table (e.g., the look-up table 108 of FIG. 1) as described with reference to FIG. 1. In response to determining that the sixth receiver 314 should be selected, the processor may initiate a configuration change to CONFIG-2 of Table 1. As shown in CONFIG-2 of Table 1, the third receiver 116 (e.g., corresponding to the fifth receiver 312 of FIG. 3A) is a non-selected receiver and the fifth receiver 120 (e.g., corresponding to the sixth receiver 314 of FIG. 3A) is a selected receiver.

In another embodiment, the processor may determine that the sixth receiver 314 should be selected by temporarily selecting the sixth receiver 314 and predicting an expected blockage of the sixth receiver 314 based on an output of a blockage detection mechanism (BDM) coupled to the sixth receiver. In a particular embodiment, temporarily selecting the sixth receiver 314 may include temporarily providing power to the sixth receiver 314 and the BDM coupled to the sixth receiver 314. The processor may determine that the sixth receiver 314 should remain selected when the prediction indicates that the sixth receiver 314 is not predicted to be at least partially blocked. When the prediction indicates that the sixth receiver 314 is predicted to be at least partially blocked, the processor may de-select the sixth receiver and temporarily select another receiver (e.g., the second receiver 306) to predict an expected blockage of the other receiver. The processor may continue this process to identify one of the receivers 306, 312, 314 that is predicted to be unblocked or not completely blocked and maintain the identified receiver as a selected receiver while the other receivers may be maintained as non-selected receivers.

At a second time, the blocking object 700 may be entirely blocking the signal path 528. Prior to the blocking object 700 entirely blocking the signal path 528, the processor may select the one of the non-selected receivers (e.g., the sixth receiver 314) and may de-select the fifth receiver 312. As shown in FIG. 7B, the signal may be reflected by the blocking object 700 along a reflection path 702 and the fifth receiver 312 may be unable to receive the signal along the signal path 528. Without a signal received by the fifth receiver 312, the apparatus 302 may be unable to determine or track a 3-dimensional (3D) location of the transmitter 204. By selecting the sixth receiver 314, the apparatus 302 is able to continue determining or tracking the 3D location of the transmitter 204.

In an embodiment, the apparatus 302 may be configured to determine the 3D location of the transmitter 204 using four or more selected receivers. If the processor, in response to predicting an expected blockage of one of the selected receivers, is unable to identify a non-selected receiver to select for use in determining the location of the transmitter 204 (e.g., all of the non-selected receivers are blocked or being used for other purposes), the processor may transition to a 2-dimensional (2D) location determination mode that enables the apparatus 302 to determine a 2D location of the transmitter 204 with fewer selected receivers (e.g., three or more active receivers). If, at a subsequent time, one of the non-selected receivers that was blocked becomes unblocked, the processor may select the unblocked non-selected receiver for use in determining the location of the transmitter 204 and transition the device back into the 3D location determination mode.

As illustrated in FIG. 7B, the reflection path 702 may cause the signal to be reflected to another receiver of the plurality of receivers 304-314. For example, the signal may be reflected by the blocking object 700 along the reflection path 702. When the sixth receiver 314 is a selected receiver, the reflected signal may be at least partially received at the sixth receiver 314 (as a multipath signal) along with the signal from the transmitter 204 propagating along signal path 530. Because the sixth receiver 314 has a line of sight path to the transmitter 204 (e.g., the source of the signal), the multipath signal may not create tracking bias in a BDM 103 coupled to the sixth receiver 314.

Referring to FIG. 7C, the blocking object 700 has moved (relative to its previous location depicted in FIG. 7B) and is at least partially blocking the signal path 526 (corresponding to the fourth receiver 310) and the signal path 528 (corresponding to the fifth receiver 312). As shown in FIG. 7C, receivers 304, 308, 310, and 314 are selected receivers and may be receiving the signal propagating along corresponding signal paths 522, 524, 526, 530. The signal propagating along signal path 528 is at least partially blocked and the fifth receiver 312 is a non-selected receiver, as described above with reference to FIG. 7B. Additionally, because the signal propagating along signal path 526 is at least partially blocked by the blocking object 700, the processor may predict an expected blockage of the fourth receiver 310.

As explained with reference to FIG. 7B, at a first time receivers 304, 308-312 were selected receivers. In response to the blocking object 700 blocking at least a portion of the signal path 528 corresponding to the fifth receiver 312, the processor selected the sixth receiver 314 and de-selected the fifth receiver 312. Thus, at a second time the selected receivers included the receivers 304, 308, 310, 314. As shown in FIG. 7C, the signal path 526 corresponding to the fourth receiver 310 is at least partially blocked. As a result, the processor may predict an expected blockage of the signal path 526 and select a non-selected receiver, such as the second receiver 306. Additionally, the processor may de-select the fourth receiver 310. The fifth receiver 312 may remain a non-selected receiver, for example, because the signal path 528 remains at least partially blocked by the blocking object 700.

Referring to FIG. 7D, the blocking object 700 has moved (from its previous location in FIG. 7C) and is blocking the signal path 524 (corresponding to the third receiver 308) and the signal path 526 (corresponding to the fourth receiver 310). In FIG. 7D, the receivers 304, 306, 308, 314 are selected receivers. The signal traveling along signal path 524 may be reflected along a reflection path 706. As illustrated in FIG. 7D, the signal propagating along signal path 524 is at least partially blocked by the blocking object 700. The at least partial blockage of the signal path 524 may cause the processor to predict an expected blockage of the third receiver 308. In response to predicting the expected blockage of the third receiver 308, the processor may identify a non-selected receiver (e.g. one of the receivers 308, 312) for use in determining the location of the transmitter 204 (i.e., as a selected receiver).

In FIG. 7D, the signal path 528 is not shown because the fifth receiver 312 is a non-selected receiver. In FIG. 7D, the signal path 528 corresponding to the fifth receiver 312 may no longer be blocked by the blocking object 700. The processor may determine that the fifth receiver 312 should be selected for use in determining the location of the transmitter 204 and may select the fifth receiver 312 and de-select the third receiver 308.

Thus, FIGS. 7A-7D show an apparatus 302 that is operable to select and de-select each of a plurality of receivers based on predicted blockages of signal paths between a signal source and each of the plurality of receivers. By predicting an expected blockage of a signal path by a blocking object (e.g., a user's hand), the apparatus 302 may be able to select an additional receiver (e.g., a non-selected receiver) for use in determining the location of the transmitter 204 prior to loss of the signal. By selecting and de-selecting receivers based on expected blockage predictions, the apparatus 302 is able to maintain a sufficient number of selected receivers for use in determining the location of the source of the signal while reducing power consumption of the apparatus 302.

Figure 8:
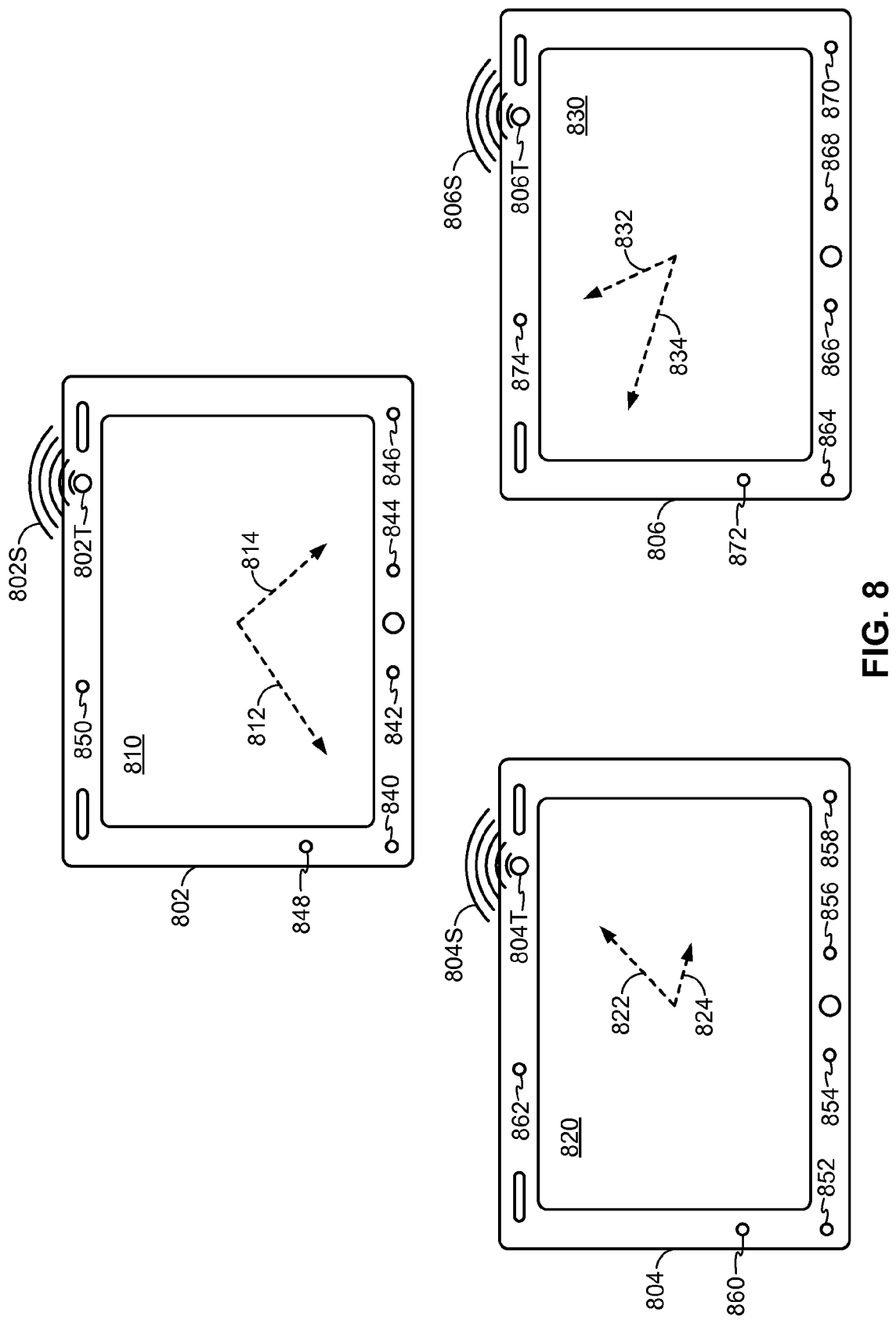
FIG. 8 illustrates another embodiment of a system for predicting an expected blockage of a signal path of an ultrasound signal.

Referring to FIG. 8, another illustrative embodiment of a system capable of detecting a location of a transmitter (or a device that includes a transmitter) is shown. In FIG. 8, a first apparatus 802, a second apparatus 804, and a third apparatus 806 are shown. In the illustrative embodiment, each of the apparatuses 802, 804, 806 may correspond to the apparatus 302 of FIGS. 3A and 3B. While three apparatuses are shown in FIG. 8, in some embodiments, more than three or fewer than three apparatuses may be used.

As illustrated in FIG. 8, the apparatus 802 includes a transmitter 802T, a display screen 810, and receivers 840-850; the apparatus 804 includes a transmitter 804T, a display screen 820, and receivers 852-862; and the apparatus 806 includes a transmitter 806T, a display screen 810, and receivers 864-874. In FIG. 8, each of the transmitters 802T, 804T, 806T may transmit a signal. For example, the transmitter 802T may transmit a signal 802S, the transmitter 804T may transmit a signal 804S, and the transmitter 806T may transmit a signal 806S. Each of the signals 802S, 804S, 806S may be unique to its respective transmitter 802T, 804T, 806T. The signals 802S, 804S, 806S may be received at a plurality of active receivers located at each of the apparatuses 802, 804, 806. For example, when the apparatus 802 is operating in a 2D location detection configuration, the receivers 840, 846, and 850 may be selected receivers (e.g., a first set of receivers) and the receivers 842, 844, and 848 may be non-selected receivers (e.g., a second set of receivers). The selected receivers 840, 846, and 850 may receive the signal 804S and the signal 806S. The apparatus 802 may determine a location of the apparatus 804 and the apparatus 806 based on the signal 804S and the signal 806S received at the selected receivers 840, 846, and 850.

Each of the apparatuses 802, 804, and 806 may be operable to determine a direction of each of the other apparatuses 802, 804, and 806 relative to itself. For example, the apparatus 802 may be operable to receive the signal 804S from the transmitter 804T and to determine a location (e.g., direction or direction and distance) of the apparatus 804 relative to the apparatus 802. For example, in response to receiving the signal 804S from the transmitter 804T at the selected receivers 840, 846, and 850 (e.g., the first set of receivers), the apparatus 802 may determine that the apparatus 804 is located in a direction 812 relative to the apparatus 802. Additionally, the apparatus 802 may determine that the apparatus 806 is located in a direction 814 relative to the apparatus 802 in response to receiving the signal 806S from the transmitter 806T at the selected receiver 840, 846, and 850. The apparatus 802 may include a software application executable by a processor of the apparatus 802 to display an indicator of the direction of the apparatus 804 (e.g., the direction 812), an indicator of the direction of the apparatus 806 (e.g., the direction 814), or both on the display screen 810 of the apparatus 802.

The apparatus 804 may be operable to receive the signal 802S from the transmitter 802T and determine a location (e.g., direction or direction and distance) of apparatus 802 relative to the apparatus 804. For example, the receivers 860, 854, and 856 of the apparatus 804 may be selected receivers (e.g., a first set of receivers) and the receivers 852, 858, and 862 may be non-selected receivers (e.g., a second set of receivers). The selected receivers 860, 854, and 856 may receive the signal 802S and the signal 806S. The apparatus 804 may determine the location of the apparatus 802 and the apparatus 806 based on the signal 802S and the signal 806S received at the selected receivers 860, 854, and 856 (e.g., the first set of receivers). The apparatus 804 may determine that the apparatus 802 is located in a direction 822 relative to the apparatus 804 and that the apparatus 806 is located in a direction 824 relative to the apparatus 804. The apparatus 804 may include a software application executable by a processor of the apparatus 804 to display an indicator of the directions 822, 824 on the display screen 820 of the apparatus 804.

The apparatus 806 may be operable to receive the signal 802S from the transmitter 802T and determine a location (e.g., direction or direction and distance) of the apparatus 802 relative to the apparatus 806. For example, the apparatus 806 may be operating in a 3D location detection mode and the receivers 864, 872, 874, and 866 of the apparatus 806 may be selected receivers (e.g., a first set of receivers). The receivers 868, 870 may be non-selected receivers (e.g., a second set of receivers). The selected receivers 864, 872, 874, and 866 may receive the signal 802S and the signal 804S. The apparatus 806 may determine the location of the apparatus 802 and a location of the apparatus 804 based on the signal 802S and the signal 804S received at the selected receivers 864, 872, 874, and 866. The apparatus 806 may determine that the apparatus 802 is located in a direction 832 relative to the apparatus 806 and that the apparatus 804 is located in a direction 834 relative to the apparatus 806. The apparatus 806 may include a software application executable by a processor of the apparatus 806 to display an indicator of the directions 832, 834 on the display screen 830 of the apparatus 806.

The system illustrated in FIG. 8 is operable to indicate a direction of a source of a signal even when the source of the signal is not between or bounded by the selected receivers (e.g., the first set of receivers) of one of the apparatuses 802, 804, 806. The apparatuses 802-806 may select and de-select receivers based on predictions of expected blockages as described with reference to FIG. 1-7D. Local echoes (from its own transmitter) from each apparatus may be strong enough to interfere with signals transmitted from other devices. The local echoes may be canceled by using pre-measured or adaptively calculated direct path transfer functions between the transmitter and each of the receivers on that apparatus. Thus, the system of FIG. 8 is capable of providing object detection using a plurality of selected receivers while consuming less power than if all receivers were selected receivers.

Figure 9:
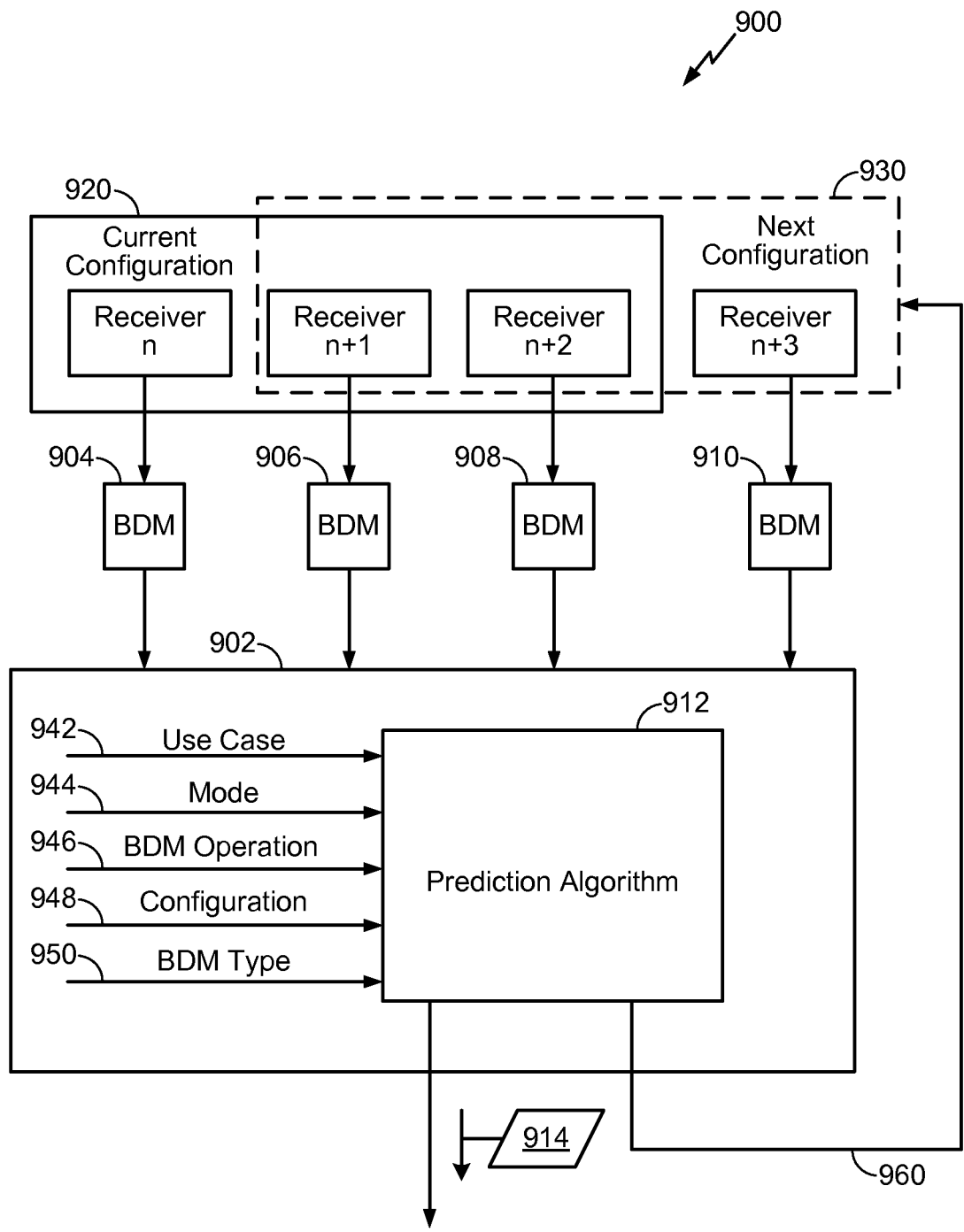
FIG. 9 is a block diagram of a system to determine a set of selected receivers and a set of de-selected receivers.

Referring to FIG. 9, a block diagram of a system 900 to determine a set of selected receivers and a set of de-selected receivers is shown. As shown in FIG. 9, the system 900 includes a plurality of receivers, including a receiver n, a receiver n+1, a receiver n+2, and a receiver n+3. In a particular embodiment, the plurality of receivers may include more receivers than shown in FIG. 9 and it should be understood that only four receivers are shown in FIG. 9 for simplicity of description. Each of the plurality of receivers is coupled to a blockage detection mechanism (BDM). For example, the receiver n is coupled to a BDM 904, the receiver n+1 is coupled to a BDM 906, the receiver n+2 is coupled to a BDM 908, and the receiver n+3 is coupled to a BDM 910. In an embodiment, the BDMs coupled to each of the plurality of receivers may correspond to the BDMs 130 of FIG. 1. For example, the BDMs 904-910 may include a DLL or a PLL configured to generate an output based on signals (e.g., ultrasound signals) received at a corresponding receiver (i.e., a receiver coupled to the BDM), as described with reference to FIG. 1. As another example, each the BDMs 904-910 may be configured to generate an output based on a signal to noise ratio (SNR) associated with the signal received at a corresponding receiver. In a particular embodiment, each of the BDMs 904-910 may include a PLL or a DLL and the SNR is determined based on an output of the PLL or the DLL.

As shown in FIG. 9, the system 900 includes a processor 902 configured to execute a prediction algorithm 912. In a particular embodiment, the prediction algorithm 912 may be stored at a memory (not shown) as instructions executable by the processor 902. In another embodiment, the processor 902 may include circuitry configured to execute the prediction algorithm. The prediction algorithm 912, when executed by the processor 902 (or circuitry of the processor 902) may cause the processor 902 to predict an expected blockage of one or more selected receivers and, in response to predicting an expected blockage of at least one of the one or more selected receivers, to select a non-selected receiver for use in determining a location of a source of the signal. The prediction algorithm 912, when executed by the processor 902 (or circuitry of the processor 902), may cause the processor 902 to de-select a selected receiver. For example, at a first time the system 900 includes a set of selected receivers 920, including receiver n, receiver n+1, and receiver n+2. At the first time the receiver n+3 may be a non-selected receiver.

As shown in FIG. 9, the prediction algorithm 912 may receive a plurality of inputs 942-950 including a use case input 942, a mode input 944, a BDM operation input 946, a configuration input 948, and a BDM type input 950. To illustrate, referring to FIG. 10, a table 1000 illustrating various prediction algorithm input values is shown. As shown in FIG. 10, the table 1000 includes a use case column 1002, a Blockage Detection Mechanism (BDM) Type column 1004, a BDM Operator column 1006, and a mode column 1008. In a particular embodiment, the use case column 1002 may correspond to the use case input 942 described with reference to FIG. 9. As shown in FIG. 10, the use case input 942 may indicate a use case corresponding to a Non-pen use case 1024, a Pen use case 1026, and a Tablet use case 1028. The Non-pen 1024 use case may correspond to when a device, such as the system 900, is not interacting with an external device, such as the stylus pen 202. The Pen use case 1026 may correspond to when the device is interacting with the external device. The Tablet use case 1028 may correspond to when the device is operating in a peer-to-peer positioning system and is determining the location of another device (e.g., another tablet device), as described with reference to FIG. 8.

In a particular embodiment, the BDM Type column 1004 may correspond to the BDM Type input 950 of FIG. 9. The BDM Type input 950 indicates a type of BDM output that is to be used to predict the expected blockage. The BDM Type input 950 may indicate whether the processor 902 is to predict the expected blockage of a particular receiver based on an output of a DLL or an output of a PLL (e.g., the BDM Type 1014), a signal to noise ratio (SNR) associated with the signal received at a corresponding receiver (e.g., the BDM Type 1012), or a SNR associated with an output of the DLL or the PLL (e.g., the BDM Type 1016). For example, each of the BDMs 904-910 of FIG. 9 may include a DLL or a PLL, a SNR device, or a combination thereof, and may be configured to generate an output based on the DLL, the PLL, the SNR device, or a combination thereof. The BDM Type input 950 may indicate to the processor 902 whether the output of a particular BDM is generated based on the DLL, the PLL, the SNR device, or a combination thereof. The processor 902, based on the BDM Type input 950, may predict whether a particular receiver coupled to the particular BDM is expected to be blocked based at least in part on the type of BDM output.

In a particular embodiment, the BDM Operation column 1006 may correspond to the BDM Operation input 946 of FIG. 9. The BDM operation input 946 may indicate that all receivers are to be powered (e.g., at BDM Operation 1018) or that only selected receivers are to receive power (e.g., at BDM Operation 1020). When the BDM operation input 946 indicates that all receivers are to be powered, the device (e.g., the system 900) may provide power to each of the receivers (i.e., both selected and non-selected receivers are powered).

In a particular embodiment, the mode column 1008 may correspond to the Mode input 944 described with reference to FIG. 9. The Mode input 944 may indicate a concurrency mode (e.g., at Mode 1030), a normal mode (e.g., at Mode 1032), or a quadmic mode (e.g., at Mode 1034). The Mode input 944 may indicates indicate to the processor 902 how the configuration of selected receivers is to be changed in response to predicting an expected blockage of a particular selected receiver (i.e., one of the selected receivers 920). For example, the system 900 may operate in a quadmic mode, a normal mode, or a concurrency mode. When operating in the quadmic mode, the system 900 may use four selected receivers to determine the location (e.g., for a 3-D location determination) of a source of a signal (e.g., the location of the stylus pen 202). In response to predicting the expected blockage of at least one of the selected receivers 920, the system 900 predicts whether a non-selected receiver is expected to be blocked. When the non-selected receiver is predicted to be unblocked, the processor 902 may select the non-selected receiver and de-select the at least one selected receiver predicted to be blocked. When the processor 902 predicts that each of the non-selected receivers is expected to be blocked, the processor 902 may change the mode to the normal mode.

When operating in the normal mode, the system 900 may use three selected receivers to determine the location (e.g., for a 2-D location determination) of the source of the signal. The processor 902 may continue to monitor the status of the non-selected receivers and predict whether one of the non-selected receivers is expected to be non-blocked. When the processor 902 determines that a particular one of the non-selected receivers is no longer predicted to be blocked, the processor 902 may select the particular one of the non-selected receivers and change the mode to the quadmic mode.

When the system 900 is operating in the concurrency mode (i.e., the Mode input 944 indicates concurrency mode 1030), the system 900 determines the position of the source of the signal using the selected receivers 920 and provides a voice capability (e.g., performing voice to text) using one of the plurality of receivers. In a particular embodiment, the receiver used to provide the voice capability may also be used by the processor 902 to determine the location of the source of the signal. In response to predicting that the receiver used for the voice capability is expected to be blocked, the system 900 may de-select the receiver used for the voice capability and select another receiver (e.g., a non-selected receiver) for use in determining the position of the source of the signal. In this embodiment, the receiver used to provide the voice capability may continue to receive power after being de-selected to continue providing the voice capability. In an alternative embodiment, the receiver used to provide the voice capability may be different than the receiver used by the processor 902 to determine the location of the source of the signal. In response to predicting the expected blockage, the processor 902 may select a non-selected receiver for use in determining the location of the source of the signal and may de-select the receiver predicted to be blocked.

In a particular embodiment, the concurrency mode may indicate a concurrency-quadmic mode or a concurrency-normal mode. When the Mode input 944 indicates the concurrency-quadmic mode, the system 900 may determine the location of the source of the signal using four selected receivers when four selected receivers are available (e.g., not being used for other functionality provided by the system 900, such as voice to text) and predicted to not be blocked. When four selected receivers are not available during concurrency-quadmic mode or the Mode input 944 otherwise indicates the concurrency-normal mode, the system 900 may determine the location of the source of the signal using three selected receivers.

The BDM operation input 946 indicates a receiver power mode. For example, a first BDM operation input may indicate that only selected receivers are to receiver power (e.g., the BDM operation input value 1018) and a second BDM operation input may indicate that all receivers are to receiver power (e.g., the BDM operation input value 1020). When the BDM input 946 is the first BDM operation input, the processor 902 may cause the system 900 to cease providing power to a particular selected receiver in response to de-selecting the particular selected receiver. When the BDM operation input 946 is the second BDM operation input, the processor 902 may cause the system 900 to continue to provide power to each of the plurality of receivers after de-selecting the particular receiver.

The configuration input 948 (not shown in FIG. 10) indicates a current receiver configuration. For example, the system 900 may store configuration information similar to Table 1 at a memory (not shown) of the system 900. The configuration information may be used by the processor 902 to determine which non-selected receiver should be selected in response to predicting an expected blockage of a selected receiver, as described with reference to FIG. 1.

An output of the prediction algorithm 912 may cause the processor 902 to modify the current configuration 920 of the receivers from a first configuration (i.e., the configuration indicated by the configuration input 948) to a second configuration. For example, at a second time subsequent to the first time, the processor 902 may modify the configuration of the receivers to a next configuration. As shown in FIG. 9, when the selected receivers are configured according to the next configuration 930, the receiver n+3 is a selected receiver and the receiver n is a non-selected receiver. The processor 902 may store information 914 associated with the next configuration at a memory of the processor or at another memory (not shown) of the system 900 and may send a control signal 960 to the receivers. In a particular embodiment, the control signal 960 may cause the receiver n+3 to listen for the signal (e.g., the ultrasound signal) and to generate an output via the BDM 910 for use by the processor 902 in determining the location of the source of the signal. The control signal 960 may cause the receiver n to stop listening for the signal and may cause the BDM 904 to stop generating an output. In a particular embodiment, the control signal 960 may cause the system 900 to provide power to the receiver n+3 and cause the system 900 to stop providing power to the receiver n.

Figure 11:
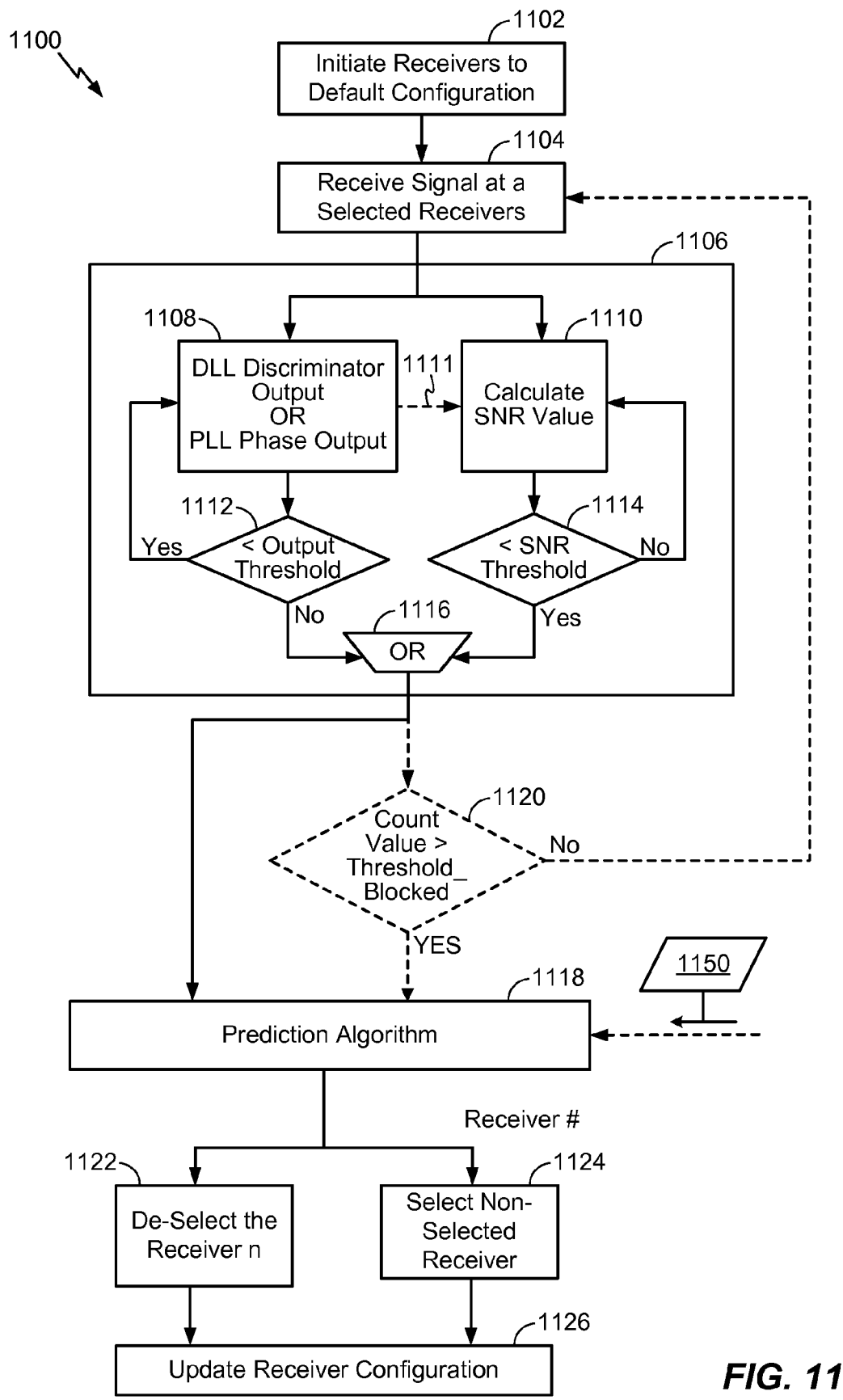
FIG. 11 is a particular embodiment of a method for updating a receiver configuration using a prediction algorithm.

Referring to FIG. 11, a particular embodiment of a method 1100 for updating a receiver configuration using a prediction algorithm is shown. The method 1100 includes, at 1102, initiating a plurality of receivers of a device (e.g., the device 100 of FIG. 1) according to a default configuration, such as one of the configurations described with reference to FIG. 1 and with reference to Table 1. At 1104, the method 1100 includes receiving a signal (e.g., an ultrasound signal) at selected receivers (e.g., the receivers in the first receiver set). At 1106, the method 1100 includes providing signal data associated with the signal received at each of the selected receivers to blockage detection mechanisms (BDMs) coupled to each of the selected receivers.

Each of the BDMs may include a delay locked loop (DLL) or a phase locked loop (PLL). At 1108, the method 1100 includes determining, at each of the BDMs, an output at one of the DLL or the PLL. When the BDMs include DLLs, the output may be a discriminator output as described with reference to FIG. 1. When the BDMs include PLLs, the output may be a phase output as described with reference to FIG. 1. At 1112, the method 1100 includes determining whether the output of each of the BDMs is less than an output threshold. The output threshold may correspond to a predetermined output value that indicates whether a receiver coupled to the BDM is at least partially blocked. For example, when the determination indicates that the output of a particular BDM is less than the output threshold, a particular receiver coupled to the particular BDM may not be at least partially blocked. When the determination indicates that the output of the particular BDM is greater than the output threshold, the particular receiver coupled to the particular BDM may be at least partially blocked.

At 1110, the method 1100 includes determining, at each of the BDMs, a signal to noise ratio (SNR) value associated with the signal received at each of the receivers. In a particular embodiment, the SNR value may be determined based on the signal data received at the BDMs from the receivers. In another particular embodiment, the SNR value may be determined based on the output of the DLL or the PLL. In this particular embodiment, the method 1100 may include, at 1111, receiving the output of the DLL or the PLL. At 1114, the method 1100 includes determining whether the SNR value is less than a SNR threshold. The SNR threshold may correspond to a predetermined SNR value that indicates whether a receiver coupled to the BDM is at least partially blocked. For example, when the determination indicates that the SNR value of a particular BDM is greater than the SNR threshold, a particular receiver coupled to the particular BDM may not be at least partially blocked. When the determination indicates that the SNR value of the particular BDM is less than the SNR threshold, the particular receiver coupled to the particular BDM may be at least partially blocked.

At 1116, the method 1100 includes receiving the output (i.e., the discriminator output of the DLL or the phase output of the PLL) and the SNR value. At 1118, the method 1100 includes determining whether to de-select a particular selected receiver and determining whether to select a particular non-selected receiver based on a prediction algorithm. In a particular embodiment, the prediction algorithm may be the prediction algorithm 912 of FIG. 9 and may receive inputs 1150. The inputs 1150 may correspond to the inputs 942-950 of FIG. 9. In response to a prediction that at least one selected receiver is expected to be at least partially blocked, the prediction algorithm may determine whether to select a non-selected receiver(s) and whether to de-select the at least one selected receiver that is expected to be at least partially blocked. At 1122, the method 1100 includes de-selecting the at least one selected receiver that is expected to be at least partially blocked, and, at 1124, the method 1100 includes selecting the non-selected receiver(s). At 1126, the method 1100 includes updating the receiver configuration. In a particular embodiment, updating the receiver configuration may include causing the device to provide power to the non-selected receiver(s) that are selected by the prediction algorithm and causing the device to stop providing power to the selected receivers that are de-selected by the prediction algorithm. In an embodiment, updating the receiver configuration may include storing information indicating a current receiver configuration at a memory of the device, as described with reference to FIG. 9.

In a particular embodiment, the method 1100 may include, at 1120, determining whether a count value exceeds a threshold_blocked count value. The count value may indicate a number of sequential BDM outputs (e.g., the output of step 1116) indicating an expected blockage of a particular receiver. When the count value exceeds the threshold_blocked count value, the prediction algorithm may be enabled. By enabling the prediction algorithm when count_value exceeds a threshold_blocked count value (e.g., when a selected receiver is expected or predicted to be blocked a threshold number of times), a device implementing the method 1100 may avoid oscillating or toggling between selected and non-selected receivers. In a particular embodiment, determining whether the count value exceeds the threshold_blocked count value may be included within the prediction algorithm.

In a particular embodiment, the default configuration may indicate that a first set of receivers of the plurality of receivers are selected receivers (i.e., used by a processor of the device for determining a location of a source of a signal) and that a second set of receivers are non-selected receivers (i.e., not used by the processor for location determinations). In another particular embodiment, each of the plurality of receivers may be initialized as selected receivers, and, in response to receiving signals at each of the plurality of receivers, the processor may determine which of the selected receivers to de-select. For example, the processor may execute a prediction algorithm, such as the prediction algorithm described with reference to FIG. 9, to determine whether to de-select one or more of the plurality of receivers.

Referring to FIG. 12, a portion of a lookup table 1200 for use with a prediction algorithm is shown. The lookup table 1200 may be stored at a memory of a device, such as the device 900 of FIG. 9. The device may include a plurality of receivers. The plurality of receivers including multiple selected receivers (e.g., a first set of receivers) and at least one non-selected receiver (e.g., a second set of receivers). As shown in FIG. 12, the lookup table 1200 includes a first column 1202, a second column 1204, a third column 1206, a fourth column 1208, a fifth column 1210, a sixth column 1212, a seventh column 1214, an eighth column 1216, a ninth column 1218, a tenth column 1220, and an eleventh column 1222. The device may use the lookup table 1200 in conjunction with a prediction algorithm (e.g., the prediction algorithm 912) to determine which non-selected receiver to select in response to predicting an expected blockage of a particular selected receiver. In a particular embodiment, the prediction algorithm may query the lookup table based on one or more of the inputs 942-950 and, in response to the query, receive a portion of the lookup table 1200 relevant to the configuration of the inputs 942-950.

For example, as shown in FIG. 12, the prediction algorithm may receive inputs (e.g., the inputs 942-950) indicating a Use Case of the device is a Pen use case (i.e., the Use Case input 942 is Pen), a Mode of the device is a Normal mode (i.e., the Mode input 944 is Normal), a BDM Operation of the device indicates that only selected receivers are to receive power (i.e., the BDM Operation input 946 is Only Selected Receivers Powered), a receiver configuration is receiver configuration 1 (i.e., the Configuration input is 1), and a BDM Type to be used by the prediction algorithm is a BDM configured to generate an SNR value (i.e., the BDM Type input 950 is SNR). The prediction algorithm may query the lookup table 1200 based on the inputs and receive the portion of the lookup table 1200 shown in FIG. 12. To illustrate, the Use Case associated with the portion of the lookup table 1220 shown in FIG. 12 is the Pen Use Case (e.g., the first column 1202 is Pen), the Mode associated with the portion of the lookup table 1220 shown in FIG. 12 is the Normal Mode, the BDM Operation associated with the portion of the lookup table 1220 shown in FIG. 12 is Only Selected Receivers Powered, and the BDM Type associated with the portion of the lookup table 1220 shown in FIG. 12 is SNR.

The prediction algorithm may use the information included in the portion of the lookup table 1200 to select a particular non-selected receiver. To illustrate, each of the columns 1208, 1210, 1212, 1214, 1216 correspond to one of the plurality of receivers and may indicate whether the corresponding receiver is selected (e.g., a value of 1) or non-selected (e.g., a value of 0). The portion of the lookup table 1200 shown in FIG. 12 indicates that when the receiver configuration of the device is the receiver configuration 1, the selected receivers include RCVR1, RCVR2, and RCVR3 and the non-selected receivers include RCVR4 and RCVR5. Assuming the particular selected receiver that the prediction algorithm predicted as expected to blocked is the RCVR1, the prediction algorithm may access the first row of the lookup table 1200 (i.e., the row associated with the receiver configuration 1) and, based on the tenth column 1220, identify the RCVR4 and the RCVR5 as non-selected receivers.

The prediction algorithm may determine a next receiver configuration based on the information value of the tenth column 1220 corresponding to the receiver configuration 1. For example, because the RCVR1 is expected to be blocked and one of the non-selected receivers (e.g., RCVR4 or RCVR5) is to be selected, the prediction algorithm may determine that the next receiver configuration is to be the receiver configuration 6 or the receiver configuration 7. The prediction algorithm may predict whether the RCVR4 and the RCVR5 are expected to be blocked as described with reference to FIGS. 1, 5A-7D, and 9-11, and as described further with reference to FIGS. 13-18. When the prediction algorithm predicts an expected blockage of the RCVR4 and predicts that the RCVR5 is not expected to be blocked, the prediction algorithm may determine that the next receiver configuration is the receiver configuration 7 (i.e., RCVRs 1 and 4 are non-selected receivers and RCVRs 2, 3, and 5 are selected receivers). When the prediction algorithm predicts an expected blockage of the RCVR5 and predicts that the RCVR4 is not expected to be blocked, the prediction algorithm may determine that the next receiver configuration is the receiver configuration 6 (i.e., RCVRs 1 and 5 are non-selected receivers and RCVRs 2, 3, and 4 are selected receivers).

The prediction algorithm, in response to determining the next receiver configuration, may store the next receiver configuration as a current receiver configuration at a memory of the device and may cause the device to modify the configuration of the receivers via one or more control signals (e.g., the control signals 960). The control signals may cause the device to de-select the RCVR1 and select either the RCVR4 or the RCVR5. Based on the BDM Operation input, the control signals may cause the device to stop providing power to the RCVR1 and to provide power to either the RCVR4 or the RCVR5 (i.e., when the BDM Operation input 946 indicates only selected receivers powered). Methods of determining which non-selected receiver to select are described further with reference to FIGS. 13-18.

Figure 13:
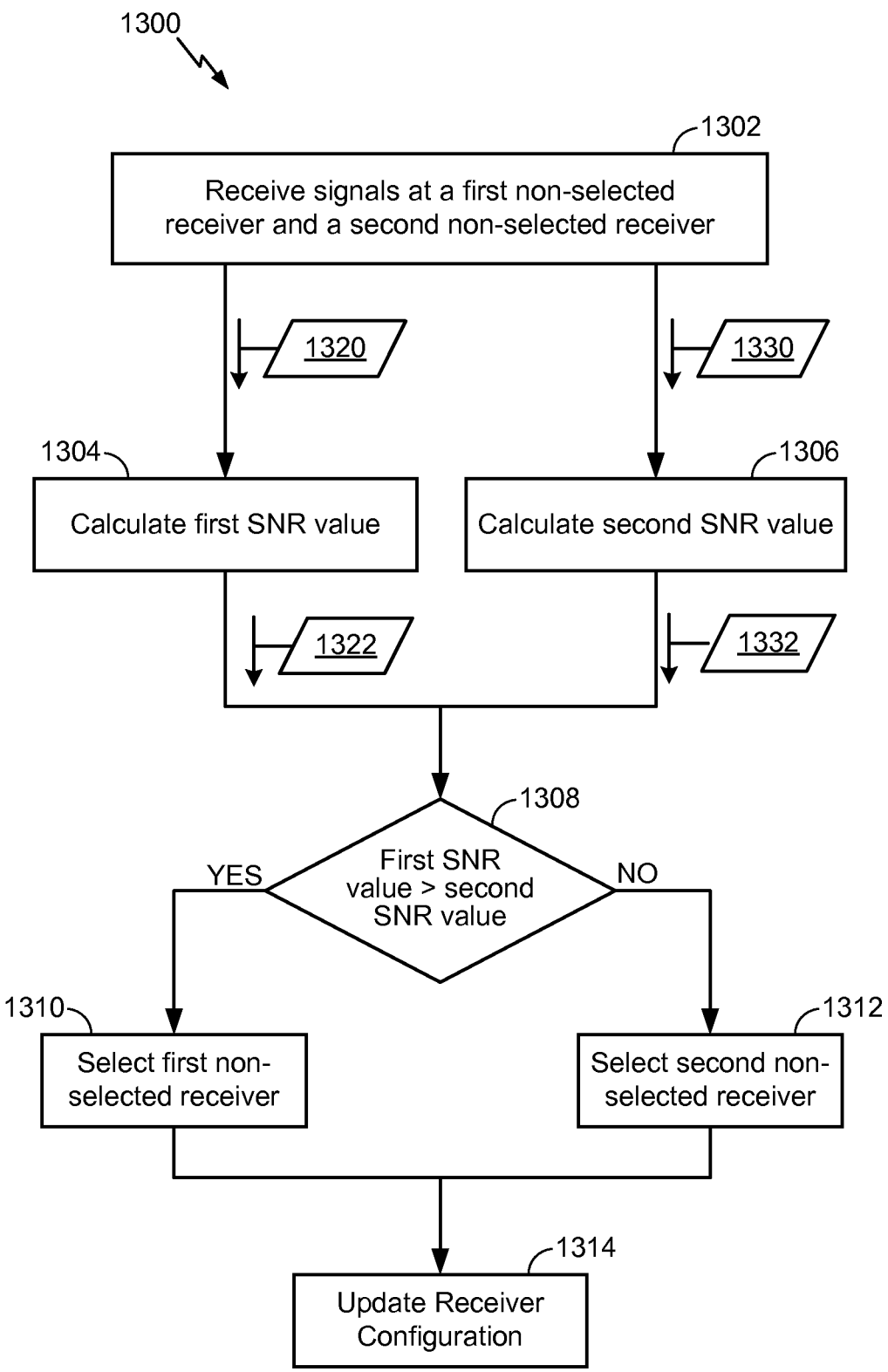
FIG. 13 is a flowchart of a method of selecting a non-selected receiver in response to predicting an expected blockage of a selected receiver.

Referring to FIG. 13, a flowchart of a method 1300 of selecting a non-selected receiver in response to predicting an expected blockage of a selected receiver is shown. In a particular embodiment, the method 1300 may be performed by a processor during execution of a prediction algorithm (e.g., the prediction algorithm 912). At 1302, the method 1300 includes receiving signals at a first non-selected receiver and a second non-selected receiver. In a particular embodiment, the first non-selected receiver may be the RCVR4 described with reference to FIG. 12 and the second non-selected receiver may be the RCVR5 described with reference to FIG. 12. The first non-selected receiver may generate first signal data 1320 and the second non-selected receiver may generate second signal data 1330. The first signal data 1320 and the second signal data 1330 may be descriptive of the signals received at the first non-selected receiver and the second non-selected receiver, respectively.

At 1304, the method 1300 includes calculating a first signal to noise ratio (SNR) value 1322 based on the first signal data 1320. At 1306, the method 1300 includes calculating a second SNR value 1332 based on the second signal data 1330. The first SNR value 1322 may correspond to a signal to noise ratio associated with the signals received at the first non-selected receiver, and the second SNR value 1332 may correspond to a signal to noise ratio associated with the signals received at the second non-selected receiver. At 1308, the method 1300 includes determining whether the first SNR value 1322 is greater than the second SNR value 1332. When the first SNR value 1322 is greater than the second SNR value 1332, the method 1300 includes, at 1310, selecting the first non-selected receiver. When the second SNR value 1332 is greater than the first SNR value 1322, the method 1300 includes, at 1312, selecting the second non-selected receiver. In a particular embodiment, selecting a non-selected receiver (e.g., the first non-selected receiver) may further include de-selecting the other non-selected receiver (e.g., the second non-selected receiver). In a particular embodiment, selecting the non-selected receiver may further include de-selecting a selected receiver that was predicted to be blocked. At 1314, the method 1300 includes updating the receiver configuration. In an embodiment, updating the receiver configuration may include generating control signals (e.g., the control signals 960) and storing the receiver configuration (e.g., the receiver configuration 914) at a memory, as described with reference to FIG. 9.

Figure 14:
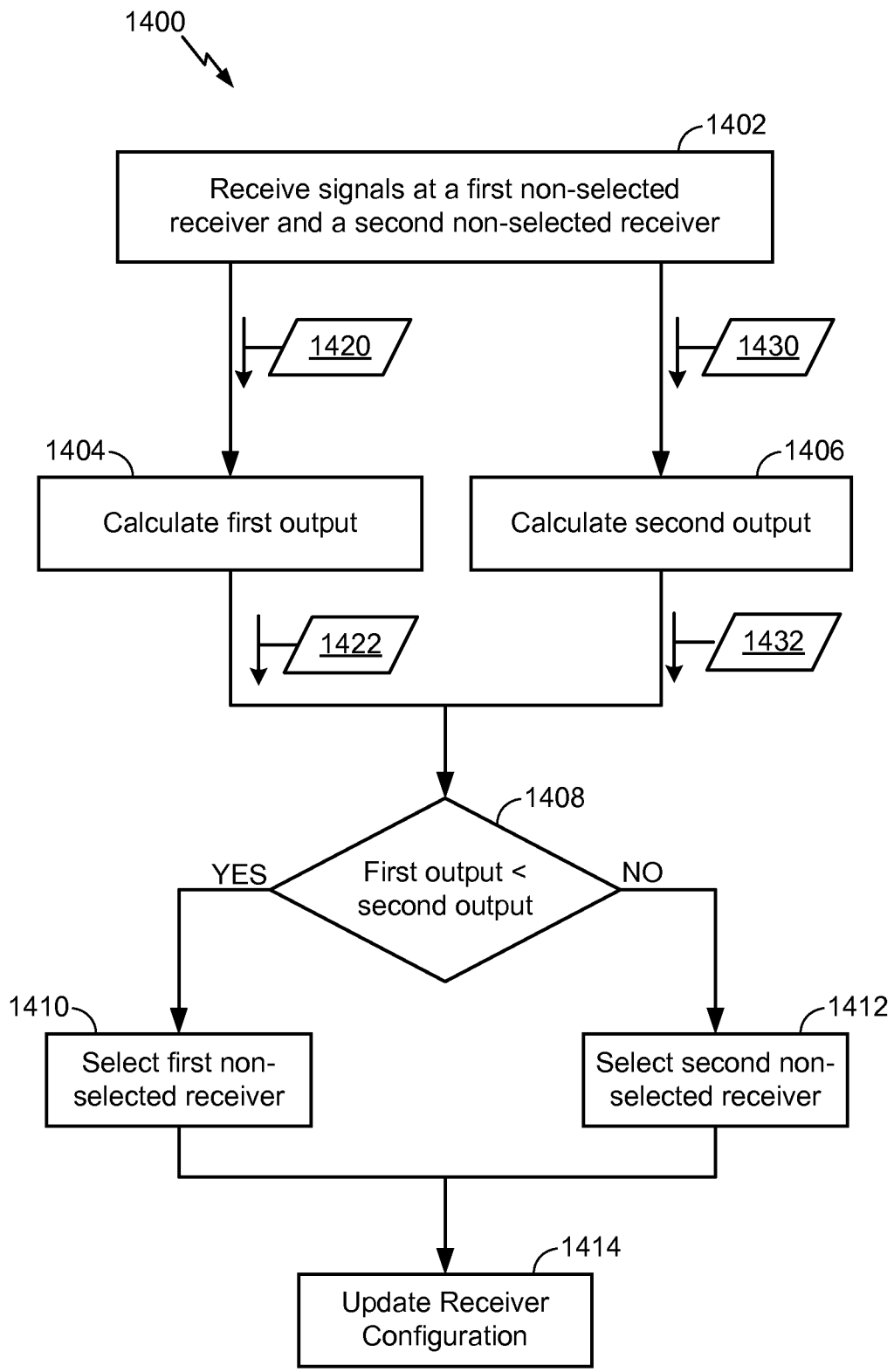
FIG. 14 is a flowchart of another method of selecting a non-selected receiver in response to predicting an expected blockage of a selected receiver.

Referring to FIG. 14, a flowchart of another method 1400 of selecting a non-selected receiver in response to predicting an expected blockage of a selected receiver is shown. In a particular embodiment, the method 1400 may be performed by a processor during execution of a prediction algorithm (e.g., the prediction algorithm 912). At 1402, the method 1400 includes receiving signals at a first non-selected receiver and a second non-selected receiver. In a particular embodiment, the first non-selected receiver may be the RCVR4 described with reference to FIG. 12 and the second non-selected receiver may be the RCVR5 described with reference to FIG. 12. The first non-selected receiver may generate first signal data 1420, and the second non-selected receiver may generate second signal data 1430. The first signal data 1420 and the second signal data 1430 may be descriptive of the signals received at the first non-selected receiver and the second non-selected receiver, respectively.

At 1404, the method 1400 includes calculating a first output 1422 based on the first signal data 1420. At 1406, the method 1400 includes calculating a second output 1432 based on the second signal data 1430. In a particular embodiment, the first output 1422 may correspond to a first discriminator output of a first delay locked loop (DLL) of a blockage detection mechanism (BDM) coupled to the first non-selected receiver, and the second output 1432 may correspond a second discriminator output of a second DLL of a second BDM coupled to the second non-selected receiver. In a particular embodiment, the first output 1422 may correspond to a first phase output of a first phase locked loop (PLL) of a blockage detection mechanism (BDM) coupled to the first non-selected receiver, and the second output 1432 may correspond a second phase output of a second PLL of a second BDM coupled to the second non-selected receiver. At 1408, the method 1400 includes determining whether the first output 1422 is less than the second output 1432. When the first output 1422 is less than the second output 1432, the method 1400 includes, at 1410, selecting the first non-selected receiver. When the second output 1432 is less than the first output 1422, the method 1400 includes, at 1412, selecting the second non-selected receiver. In a particular embodiment, selecting a non-selected receiver (e.g., the first non-selected receiver) may further include de-selecting the other non-selected receiver (e.g., the second non-selected receiver). In a particular embodiment, selecting the non-selected receiver may further include de-selecting the selected receiver that was predicted to be blocked. At 1414, the method 1400 includes updating the receiver configuration.

Figure 15:
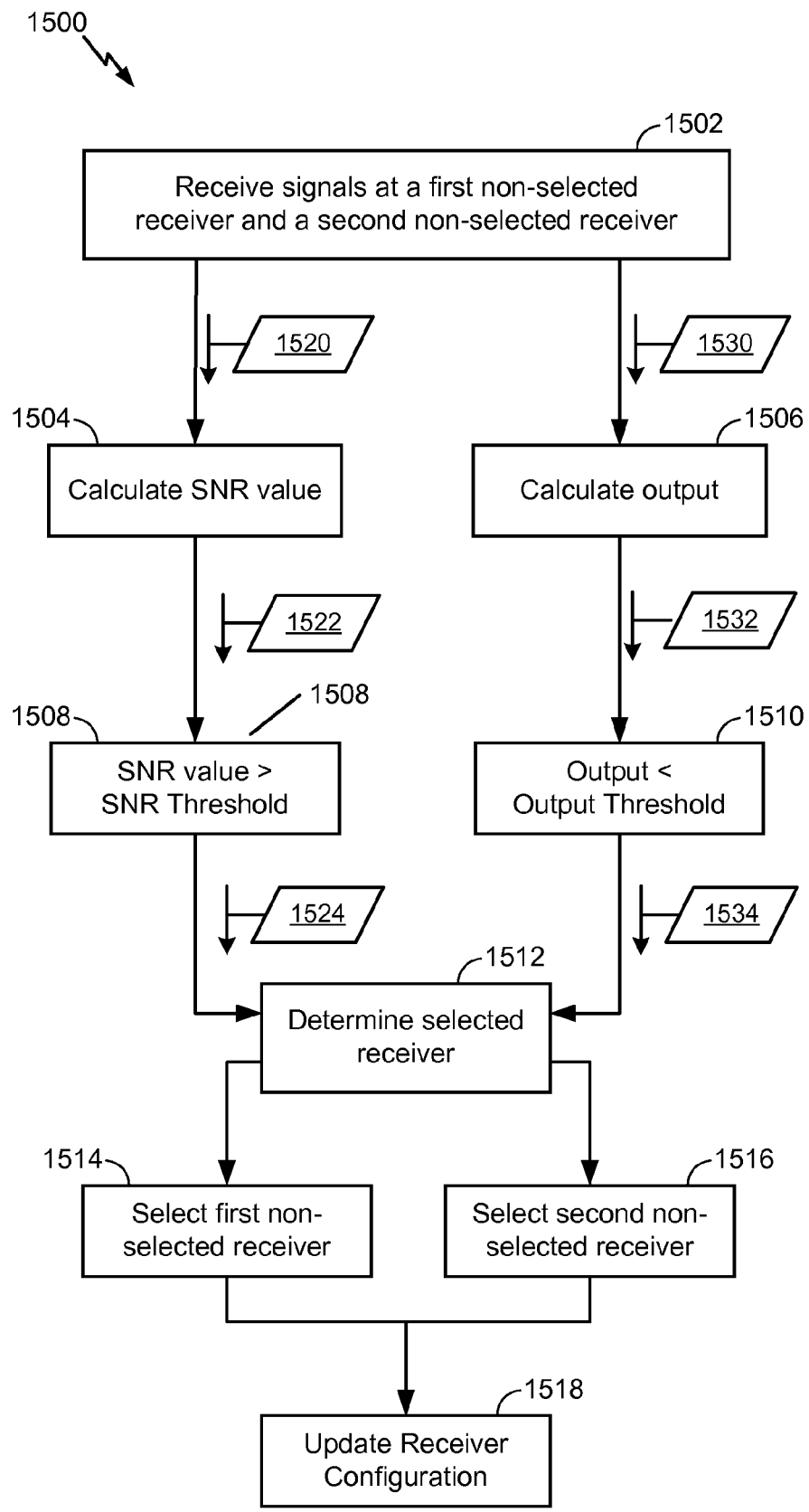
FIG. 15 is a flowchart of another method of selecting a non-selected receiver in response to predicting an expected blockage of a selected receiver.

Referring to FIG. 15, a flowchart of another method 1500 of selecting a non-selected receiver in response to predicting an expected blockage of a selected receiver is shown. In a particular embodiment, the method 1500 may be performed by a processor during execution of a prediction algorithm (e.g., the prediction algorithm 912). At 1502, the method 1500 includes receiving signals at a first non-selected receiver and a second non-selected receiver. In a particular embodiment, the first non-selected receiver may be the RCVR4 described with reference to FIG. 12 and the second non-selected receiver may be the RCVR5 described with reference to FIG. 12. The first non-selected receiver may generate first signal data 1520, and the second non-selected receiver may generate second signal data 1530. The first signal data 1520 and the second signal data 1530 may be descriptive of the signals received at the first non-selected receiver and the second non-selected receiver, respectively.

At 1504, the method 1500 includes calculating a SNR value 1522 based on the first signal data 1520. At 1506, the method 1500 includes calculating an output 1532 based on the second signal data 1530. In a particular embodiment, the SNR value 1522 may correspond to a signal to noise ratio associated with the signals received at the first non-selected receiver, and the second output 1532 may correspond a discriminator output of a delay locked loop (DLL) or a phase output of a phase locked loop (PLL) of a BDM coupled to the second non-selected receiver. At 1508, the method 1500 includes determining whether the SNR value 1522 is less than an SNR threshold (e.g., the SNR threshold described with reference to FIG. 11). At 1510, the method 1500 includes determining whether the output (i.e., the discriminator output or the phase output) is less than an output threshold (e.g., the output threshold described with reference to FIG. 11). In a particular embodiment, the prediction algorithm may determine whether the SNR value 1522 is greater than the SNR threshold and whether the output is less than the output threshold. At 1512, the method 1500 includes determining, based on an output 1524 of the comparison of the SNR value 1522 to the SNR threshold, and based on an output 1534 of the comparison of the output 1532 to the output threshold, a selected receiver for use in determining a location of a source of the signals.

When the output 1524 indicates that the SNR value 1522 is greater than the SNR threshold and the output 1534 indicates that the output 1532 is greater than the output threshold, the method 1500 includes, at 1514, selecting the first non-selected receiver. When the output 1524 indicates that the SNR value 1522 is less than the SNR threshold and the output 1534 indicates that the output 1532 is less than the output threshold, the method 1500 includes, at 1516, selecting the second non-selected receiver. When the output 1524 indicates that the SNR value 1522 is less than the SNR threshold and the output 1534 indicates that the output 1532 is greater than the output threshold, determining which of the non-selected receivers is to be selected may be determined based on other factors. For example, when outputs of each of the BDMS coupled to non-selected receivers do not satisfy a threshold (e.g., an SNR value is less than the SNR threshold or a discriminator output or phase output is greater than the output threshold), the particular non-selected receiver to be selected for use in determining the location of the source of the signals may be determined based on a predetermined order or based on a location of the particular non-selected receiver relative to the selected receiver that is predicted to be blocked. In a particular embodiment, selecting a non-selected receiver (e.g., the first non-selected receiver) may further include de-selecting the other non-selected receiver (e.g., the second non-selected receiver). In a particular embodiment, selecting the non-selected receiver may further include de-selecting the selected receiver that was predicted to be blocked. At 1518, the method 1500 includes updating a receiver configuration. In an embodiment, updating the receiver configuration may include generating control signals (e.g., the control signals 960) and storing the receiver configuration (e.g., the receiver configuration 914) at a memory, as described with reference to FIG. 9.

Referring to FIG. 16A, a flowchart of a method 1600 of providing power to selected receivers based on an output of a blockage detection mechanism (BDM) including a delay locked loop (DLL) or a phase locked loop (PLL) is shown. The method 1600 includes, at 1602, initializing a plurality of receivers to a default configuration. In a particular embodiment, the default configuration may identify a first set of the plurality of receivers as selected receivers and a second set of the plurality of receivers as non-selected receivers. In another particular embodiment, the default configuration may identify each of the plurality of receivers as selected receivers and a set of non-selected receivers may subsequently be determined based on an output of a BDM (e.g., a discriminator output of a DLL, a phase output of a PLL, or a SNR value). In an embodiment, the default configuration may be determined based on a lookup table (e.g., the Table 1 described with reference to FIG. 1).

At 1604, the method 1600 includes receiving a signal (e.g., an ultrasound signal) at a selected receiver. At 1606, the method 1600 includes calculating, at a BDM coupled to the selected receiver, one of a discriminator output and a phase output. In a particular embodiment, the BDM may include a DLL, a PLL, or both. The DLL may be configured to calculate the discriminator output based on the signal received at the selected receiver. The PLL may be configured to calculate the phase output based on the signal received at the selected receiver. At 1608, the method 1600 includes determining whether the output of the BDM is less than an output threshold. In a particular embodiment, the output threshold corresponds to a predetermined value that indicates the receiver coupled to the BDM is not blocked (or not partially blocked). In another particular embodiment, the output threshold corresponds to a predetermined value that indicates the receiver coupled to the BDM is at least partially blocked.

When the output (e.g., the discriminator output or the phase output) of the BDM is less than the output threshold (i.e., the receiver coupled to the BDM is not blocked), the method 1600 may include, at 1620, monitoring the output of the BDM. In an embodiment, monitoring the output of the BDM may include calculating a second output of the BDM. In another embodiment, monitoring the output of the BDM may include determining whether a time period has elapsed and, when the time period has elapsed, calculating the second output of the BDM. When the output of the BDM exceeds or is equal to the output threshold (i.e., the receiver is blocked), the method 1600 includes, at 1610, executing a prediction algorithm (e.g., the prediction algorithm 912 of FIG. 9). In a particular embodiment, the prediction algorithm may predict whether a non-selected receiver is expected to be blocked, as described with reference to FIGS. 1, 5A-7D, and 9-15.

At 1612, the method 1600 includes turning off (i.e., ceasing to provide power to) the selected receiver that was predicted to be blocked based on the output (i.e., the output calculated at 1606) of the BDM and, at 1614, turning on (i.e., providing power to) the non-selected receiver identified based on the prediction algorithm, as described with reference to FIGS. 13-15. At 1616, the method 1600 includes updating the receiver configuration. In an embodiment, updating the receiver configuration may include generating control signals (e.g., the control signals 960) and storing the receiver configuration (e.g., the receiver configuration 914) at a memory, as described with reference to FIG. 9.

Referring to FIG. 16B, a flowchart of a method 1650 of providing power to selected receivers based on an output of a blockage detection mechanism (BDM) configured to generate a signal to noise ratio (SNR) value is shown. The method 1650 includes, at 1652, initializing a plurality of receivers to a default configuration. In a particular embodiment, the default configuration may identify a first set of the plurality of receivers as selected receivers and a second set of the plurality of receivers as non-selected receivers. In another particular embodiment, the default configuration may identify each of the plurality of receivers as selected receivers and a set of non-selected receivers may subsequently be determined based on an output of a BDM (e.g., a discriminator output of a DLL, a phase output of a PLL, or a SNR value). In an embodiment, the default configuration may be determined based on a lookup table (e.g., the Table 1 described with reference to FIG. 1).

At 1654, the method 1650 includes receiving a signal (e.g., an ultrasound signal) at a selected receiver. At 1656, the method 1650 includes calculating, at a BDM coupled to the selected receiver, an SNR value. At 1658, the method 1650 includes determining whether the output of the BDM (e.g., the SNR value) is greater than an SNR threshold. In a particular embodiment, the SNR threshold corresponds to a predetermined SNR value that indicates the receiver coupled to the BDM is not blocked (or not partially blocked). In another particular embodiment, the SNR threshold corresponds to a predetermined SNR value that indicates the receiver coupled to the BDM is at least partially blocked.

When the SNR value is greater than the SNR threshold (i.e., the receiver coupled to the BDM is not blocked), the method 1650 may include, at 1670, monitoring the SNR value output by the BDM. In an embodiment, monitoring the SNR value may include calculating a second SNR value. In another embodiment, monitoring the SNR value output by the BDM may include determining whether a time period has elapsed and, when the time period has elapsed, calculating the second SNR value. When the SNR value is less than or is equal to the SNR threshold (i.e., the receiver is blocked), the method 1650 includes, at 1610, executing a prediction algorithm (e.g., the prediction algorithm 912). In a particular embodiment, the prediction algorithm may predict whether a non-selected receiver is expected to be blocked, as described with reference to FIGS. 13-15.

At 1662, the method 1650 includes turning off (i.e., ceasing to provide power to) the selected receiver that was predicted to be blocked based on the SNR value (i.e., the SNR value calculated at 1656) and, at 1664, turning on (i.e., providing power to) to the non-selected receiver identified based on the prediction algorithm, as described with reference to FIGS. 13-15. At 1666, the method 1650 includes updating the receiver configuration. In an embodiment, updating the receiver configuration may include generating control signals (e.g., the control signals 960) and storing the receiver configuration (e.g., the receiver configuration 914) at a memory, as described with reference to FIG. 9.

Figure 17:
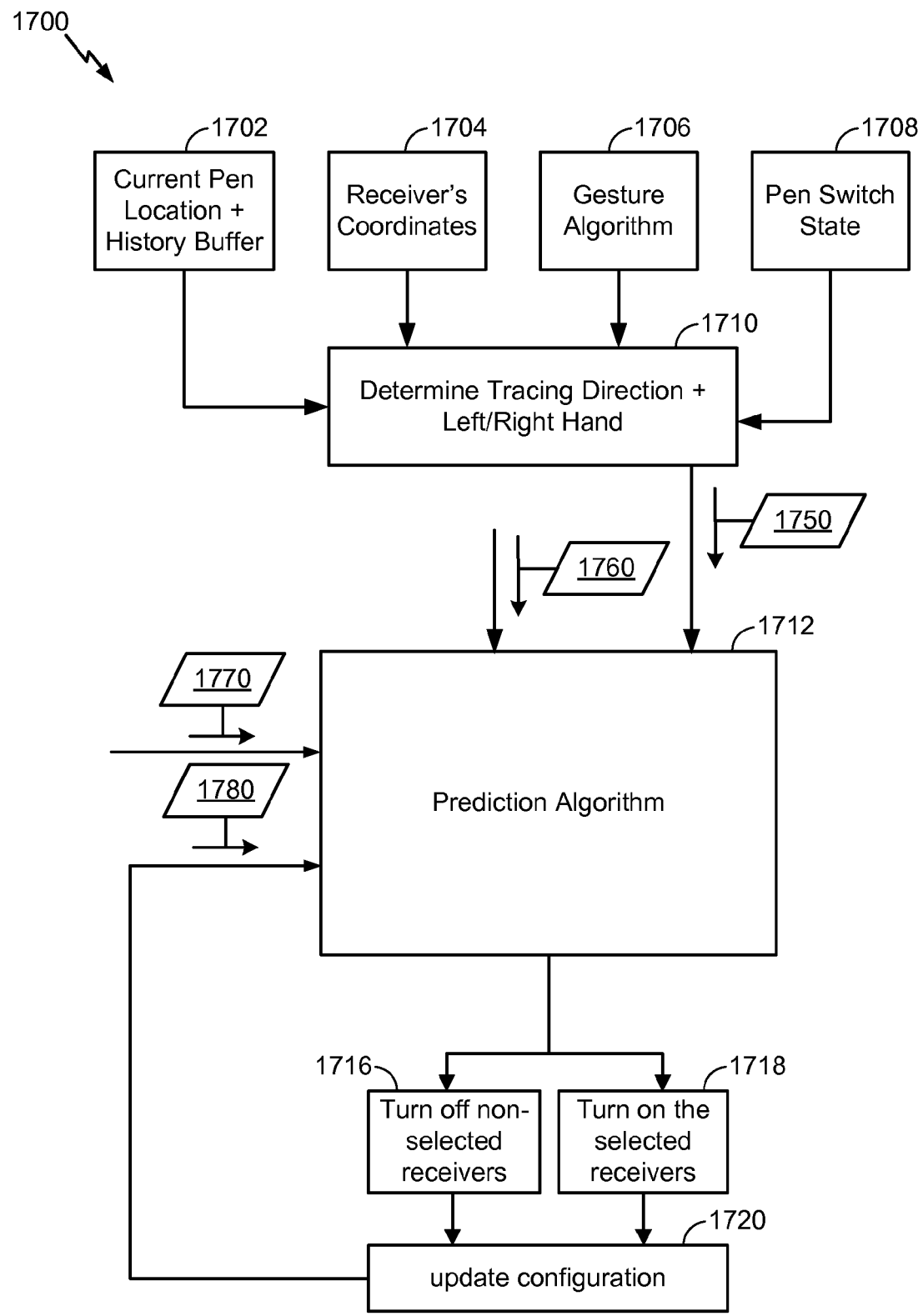
FIG. 17 is a flowchart of a method of predicting an expected blockage of a selected receiver.

Referring to FIG. 17, a flowchart of a method 1700 of predicting an expected blockage of a selected receiver is shown. The method 1700 includes, at 1710, determining a tracing direction of a source of a signal. The method 1700 may be performed by a processor (e.g., the processor 102 of FIG. 1) to determine a tracing direction (e.g., a direction of travel or expected direction of travel) of a transmitter (e.g., the transmitter 204 of FIG. 2). The tracing direction may be determined based on information received at the processor. For example, information associated with a current location of the source of the signal may be received at the processor from a location history buffer 1702. Additionally, or in the alternative, the processor may receive information associated with one or more previous locations of the source of the signal from the location history buffer 1702.

In an embodiment, the one or more previous locations may be used to determine whether a user of the device is right or left handed. For example, if the one or more previous locations indicate that the source of the signal is predominately blocked from the receivers to the right of the source location as the source moves from left to right, the user may be right handed. If the one or more previous locations indicate that the source of the signal is predominately blocked from the receivers to the left of the source location as the source moves from left to right, the user may be left handed. The processor may receive a gesture algorithm or output of the gesture algorithm from a gesture algorithm unit 1706. The gesture algorithm, or an output of the gesture algorithm, may be executed, at 1710, to determine the tracing direction of the source of the signal based on the current location of the source of the signal and the one or more previous locations of the source of the signal. Additionally, coordinates of receivers 1704 (e.g., the receivers 112-124) may be received by the processor.

At 1704, the method 1700 includes determining coordinates associated with non-selected receivers. The coordinates may be provided to the gesture algorithm 1706 for use in determining the tracing direction. In a particular embodiment, the tracing direction information 1750 may include the coordinates associated with the non-selected receivers, an indication of whether the user is left handed or right handed, the pen switch state, the selected receiver that is expected to be blocked, or any combination thereof. For example, if the user is right handed and the determined tracing direction is left to right, the prediction algorithm may use a table-look-up to identify a non-selected receiver with a coordinate position to the left of the current location of the source of the signal. A non-selected receiver with a coordinate position to the left of the location of the source of the signal may be less likely to be blocked in the future because the information received from the history buffer indicates that the user is right handed and that selected receivers to the right of the source of the signal are more likely to be blocked when the tracing direction is left to right. As a result of the table-look-up, a next receiver configuration (e.g., CONFIG-2 of Table 1) may be identified. In a particular embodiment, the prediction algorithm may determine the tracing direction and may generate the tracing direction information 1750.

When the source of the signal is a stylus pen, such as the stylus pen 202 of FIG. 2, the method 1700 may also include receiving a pen switch state 1708. The pen switch state 1708 may indicate whether the stylus pen is being used to input information. For example, the pen switch state 1708 may have a first value when a nib of the stylus pen is touching or nearly touching a writing surface (e.g., the display 322 of FIG. 3A) and may have a second value when the nib of the pen is not touching or nearly touching the writing surface.

The method 1700 includes, at 1712, executing a prediction algorithm (e.g., the prediction algorithm 912 of FIG. 9) to identify or more non-selected receivers that may be selected in response to predicting an expected blockage of a selected receiver. As shown in FIG. 17, the prediction algorithm may receive tracing direction information 1750 that indicates the tracing direction determined at 1710 and signal data 1760 that includes an output (i.e., a discriminator output of a DLL, a phase output of a PLL, an SNR value, or a combination thereof) of each BDM coupled to a selected receiver. The prediction algorithm may also receive input data 1770. In a particular embodiment, the input data 1770 corresponds to one or more the inputs 942-950 described with reference to FIG. 9. In a particular embodiment, the input data 1770 may include count enable control data. The count enable control data may indicate whether the prediction algorithm is to determine whether to predict an expected blockage of a particular receiver, or to select a non-selected receiver when a count value exceeds a threshold_blocked count value, as described with reference to FIG. 9.

In a particular embodiment, the input data 1770 may include a Use Case input (e.g., the Use Case input 942) indicating that the device is operating in a Pen Mode and is interacting with an external device (e.g., the stylus pen). The prediction algorithm may, based on the use case input, use the tracing direction information 1750 when predicting an expected blockage of a selected receiver and may also use the tracing direction information 1750 when determining which non-selected receiver should be selected in response to predicting an expected blockage of a selected receiver. When the Use Case input does not indicate the device is operating in the Pen Mode, the prediction algorithm may not use the tracing direction information 1750.

In another particular embodiment, the input data 1770 may include a Use Case input (e.g., the Use Case input 942 of FIG. 9) indicating that the device is operating in a Tablet Mode and is interacting with another device (e.g., a tablet device). For example, the device may, based on signals received at the selected receivers, determine a direction of and/or distance to the other device relative to the device. The prediction algorithm may, based on the use case input indicating that the device is operating in the Tablet mode, use the gesture algorithm 1706 and the tracing information 1750 to predict a direction of travel of the other device. The prediction algorithm may predict an expected blockage of a selected receiver based at least in part on the direction of travel of the other device and may also use the direction of travel of the other device when determining which non-selected receiver should be selected in response to predicting an expected blockage of a selected receiver. For example, when the other device is moving left to right relative to the device, the prediction algorithm may determine that a non-selected receiver located on the left side of the device, or a receiver located closer to the other device (e.g., based on the distance and direction), is less likely to be blocked and select the non-selected receiver.

In a particular embodiment, the prediction algorithm may validate the next receiver configuration. Validating the next receiver configuration may include determining whether one or more non-selected receivers to be selected are expected to be blocked. If the next receiver configuration is invalid (e.g., one or more receivers identified as selected receivers in the next receiver configuration are predicted to be blocked), the method 1700 includes, at 1712, performing the table-look-up again. If the next receiver configuration is valid (e.g., the receivers identified as selected receivers in the next receiver configuration are not predicted to be blocked), or if validation is skipped, the method may include, at 1716, turning off one or more selected receivers identified in the next receiver configuration as non-selected receivers (e.g., ceasing to provide power to selected receivers predicted to be blocked). The method may include, at 1718, turning on one or more non-selected receivers identified in the next receiver configuration as selected receivers (e.g., providing power to selected receivers). By dynamically powering the selected receivers on and the de-selected receivers off using the method 1700, a device is able to maintain a reduced number of selected receivers for use in determining a location of the source of the signal, thus reducing power consumption.

Figure 18:
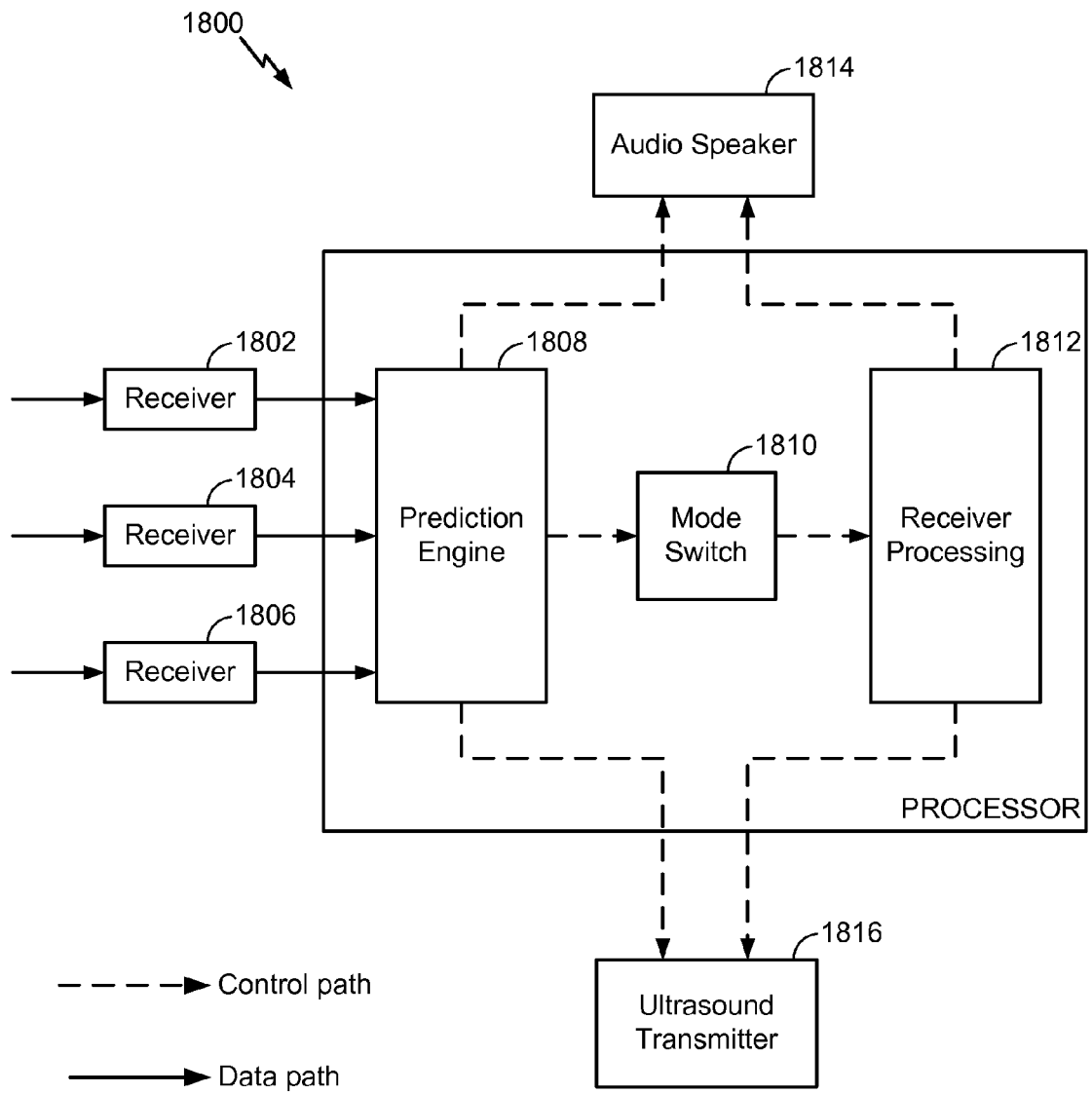
FIG. 18 is illustrates an embodiment of a system to predict an expected blockage of a selected receiver.

Referring to FIG. 18, an embodiment of a system 1800 configured to predict an expected blockage of a selected receiver is shown. The system 1800 includes receivers 1802-1806, a prediction engine 1808, a mode switch 1810, a receiver processing unit 1812, an ultrasound transmitter 1816, and an audio speaker 1814. As shown in FIG. 18, each of the receivers 1802-1806 is coupled to the prediction engine 1808. In an embodiment, the receivers 1802-1806 may be coupled to BDMs (not shown) and an output of the BDMs may be provided to the prediction engine 1808. The prediction engine 1808 may predict an expected blockage of a signal path between a source of a signal and each of the receivers 1802-1806. For example, the prediction engine 1808 may predict the expected blockage of the signal path by executing a prediction algorithm, such as the prediction algorithm 912 described with reference to FIG. 9. In response to predicting an expected blockage, the prediction engine 1808 may identify a non-selected receiver (not shown) that is to be selected. The prediction engine 1808 may transmit a signal to the mode switch 1810 that identifies the non-selected receiver that is to be selected, and the mode switch 1810 may select (e.g., activate) the identified receiver. The mode switch 1810 may de-select (e.g., deactivate) the receiver that is predicted to be blocked. The receiver processing unit 1812 may perform location detection (e.g., 2D or 3D location detection) as described with reference to FIGS. 1-8. For example, in an embodiment, the receiver processing unit 1812 may determine the location of the source of the signal using a time difference of arrival (TDOA).

In a particular embodiment, when a user is using the system 1800 to perform multiple activities simultaneously or concurrently (e.g., using a receiver to input audio data, using multiple receivers for stylus pen location tracking and listening to audio output by the system 1800), the system 1800 may allocate resources of the system 1800, such as the audio speakers 1814 and the ultrasound transmitter 1816, to perform the multiple activities. For example, the ultrasound transmitter 1816 may be used to send ultrasound signals to detect blocked microphone channels so that the system 1800 uses an unblocked microphone or other receiver to receive the audio input from the user. The unblocked microphones or other receivers can also be used to control a speaker path signal, such as a signal level, a pattern, a signal path (in a multiple speaker scenario), etc., for noise cancellation or other purposes.

Figure 19:
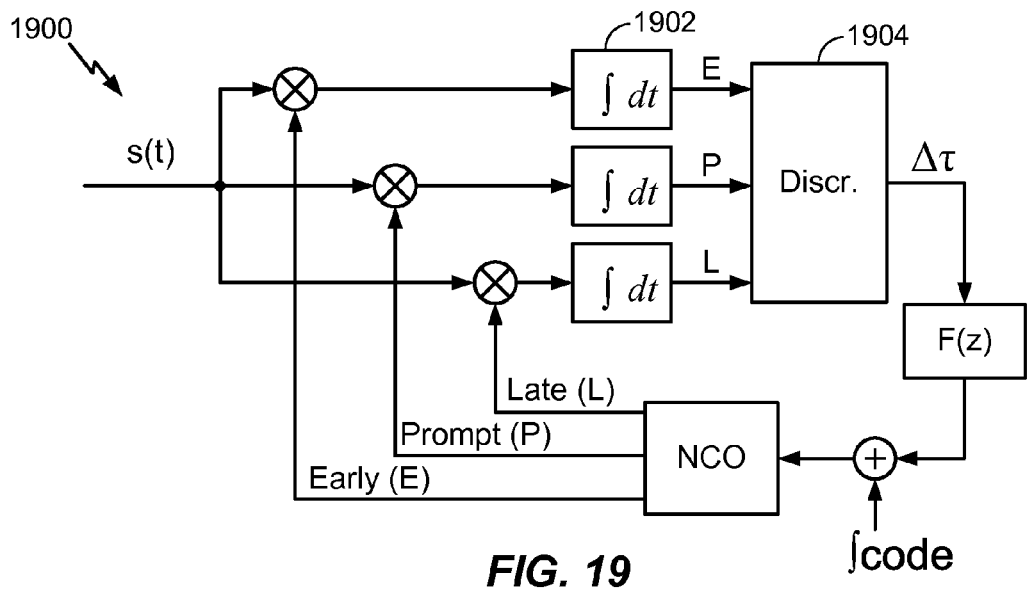
FIG. 19 is an illustrative example of a circuit for implementing a delay locked loop (DLL) for use in predicting an expected blockage of a signal path of a signal.

Referring to FIG. 19, an illustrative example of a circuit for implementing a delay locked loop (DLL) for use in predicting an expected blockage of a signal path of a signal is shown and generally designated 1900. The DLL 1900 of FIG. 19 may be used as a blockage detection mechanism (BDM). The DLL 1900 may receive a signal s(t). The signal s(t) may be provided to a discriminator by a receiver (e.g., one of the receivers 112-124 of FIG. 1). The signal s(t) is provided to processing blocks 1902. A first processing block 1902 may provide a first processed signal s(t) to a discriminator 1904 via a path E. A second processing block 1902 may provide a second processed signal s(t) to the discriminator 1904 via a path P. A third processing block 1902 may provide a third processed signal s(t) to the discriminator 1904 via a path L. The discriminator 1904 may generate an output Δt. The output Δt of the discriminator 1904 may be provided to a processor (e.g., the processor 102 of FIG. 1). The processor may predict an expected blockage of a signal path between a source of the signal s(t) and the selected receiver that provides the signal to the DLL based on the output Δt. Thus, the output Δt generated by the DLL of FIG. 19 may be used by a processor (e.g., the processor 102) to predict an expected blockage of a selected receiver. A device may select and de-select receivers based on the predicted expected blockage, thus consuming less power than if all receivers were kept selected (i.e., actively being used to process signals).

Referring to FIG. 20, an illustrative example of an output of the DLL of FIG. 19 is shown. As shown in FIG. 20, a correct offset occurs when the output of the discriminator 1904 is zero. A discriminator output of zero may indicate that a selected receiver is receiving a signal from a signal source via a signal path that has line of sight between the signal source and the selected receiver (i.e., the signal path is not blocked).

Referring to FIG. 21, another illustrative example of an output of the DLL of FIG. 19 is shown. As shown in FIG. 21, a correct offset occurs when the output of the discriminator is zero. In FIG. 21, the discriminator output is offset to the right of the correct offset of zero. A non-zero discriminator output may indicate that a selected receiver is receiving a signal from a signal source via a signal path that is at least partially blocked. For example, the non-zero discriminator output may indicate that the signal path is partially blocked as described with reference to FIG. 6B or that the signal path is completely blocked as described with reference to FIG. 6C.

Figure 22:
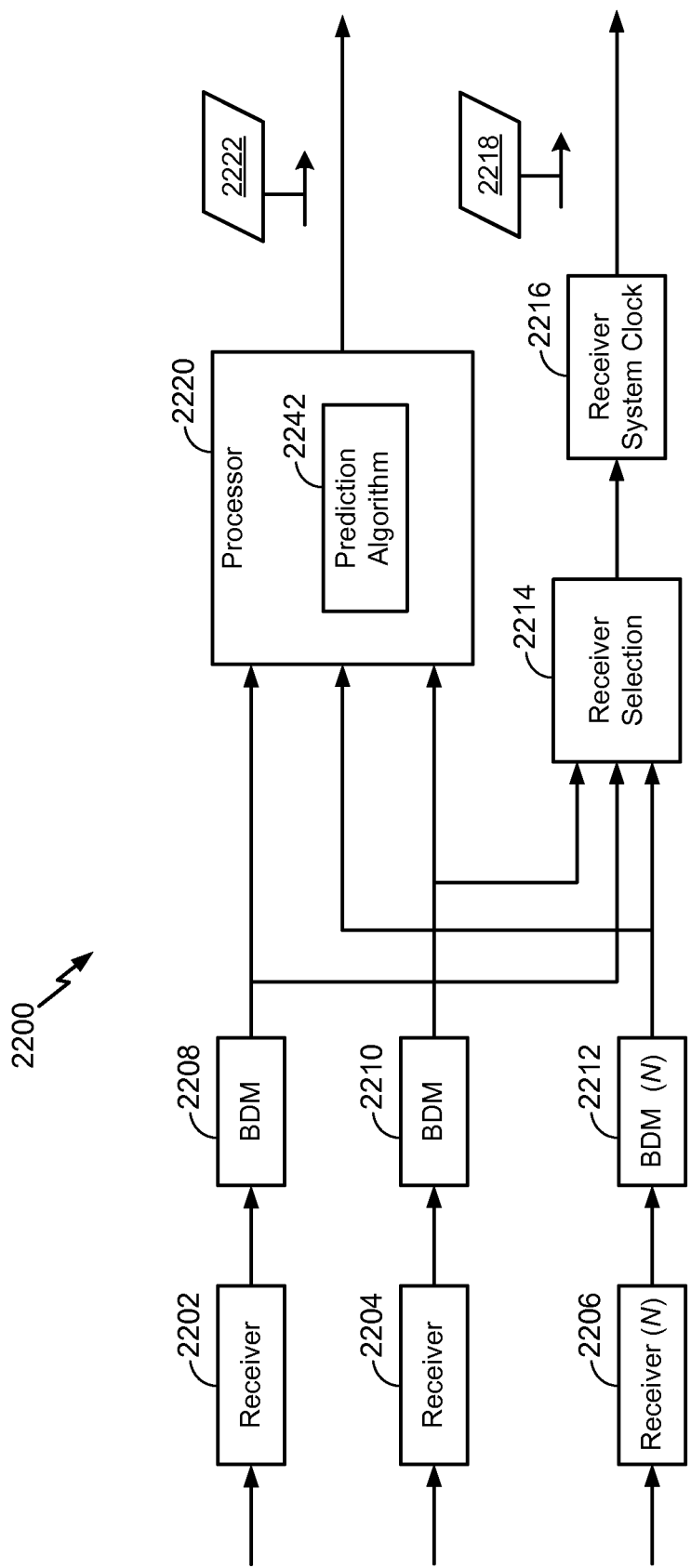
FIG. 22 illustrates another embodiment of a system for predicting an expected blockage of a signal path of an ultrasound signal.

Referring to FIG. 22, a block diagram of an embodiment of a system 2200 is shown. The system 2200 may be used to synchronize a system clock signal (e.g., the clock signal 150 of FIG. 1) with a clock signal associated with a source of a received signal (e.g., the clock signal 206 of FIG. 2). As shown in FIG. 22, the system 2200 includes multiple receivers (e.g., the receiver 2202-receiver (N) 2206). Each of the receivers 2202-2206 may be coupled to a blockage detection mechanism (BDM). For example, the receiver 2202 is coupled to a first BDM 2208, the receiver 2204 is coupled to a second BDM 2210, and the receiver (N) 2206 is coupled to a BDM 2212. Each of the BDMs 2208-2212 may provide an output (e.g., a discriminator output) to a receiver selection unit 2214 and to a processor 2220. In an embodiment, only some of the receivers 2202-2206 are selected receivers (e.g., a first set of receivers) and only the BDMs that are coupled to the selected receivers provide an output to the receiver selection unit 2214.

The receiver selection unit 2214 may identify a particular selected receiver of the receivers 2202-2206 with a lowest output value (e.g., a lowest discriminator output). As described with reference to FIG. 20, when a signal path between a source of a signal and a receiver is unobstructed (i.e., a line of sight signal path exists), the output of a DLL is zero or below a threshold. When the signal path between the source of the signal and the receiver is at least partially blocked (i.e., there is not a complete line of sight signal path), the output of a DLL is non-zero or greater than a threshold. The receiver selection unit 2214 may provide the signal corresponding to the received output of the BDM of the particular selected receiver to a receiver system clock 2216. The receiver system clock 2216 may generate a clock signal 2218 that may be used to synchronize a system clock signal (e.g., the clock signal 150 of FIG. 1) with a clock signal of the source of the signal (e.g., clock signal 206 of FIG. 2). The synchronized clock signals may be used to perform time difference of arrival calculations to determine a location of a source of the received signal.

As shown in FIG. 22, the outputs of the BDMs may be provided to the processor 2220. The processor 2220 may execute a prediction algorithm 2242 (e.g., the prediction algorithm 912 of FIG. 9). In response to executing the prediction algorithm 2242, the processor 2220 may generate an output 2222. The output 2222 may include a control signal (e.g., the control signal 960), an updated receiver configuration (e.g., the configuration data 914), or both.

Figure 23:
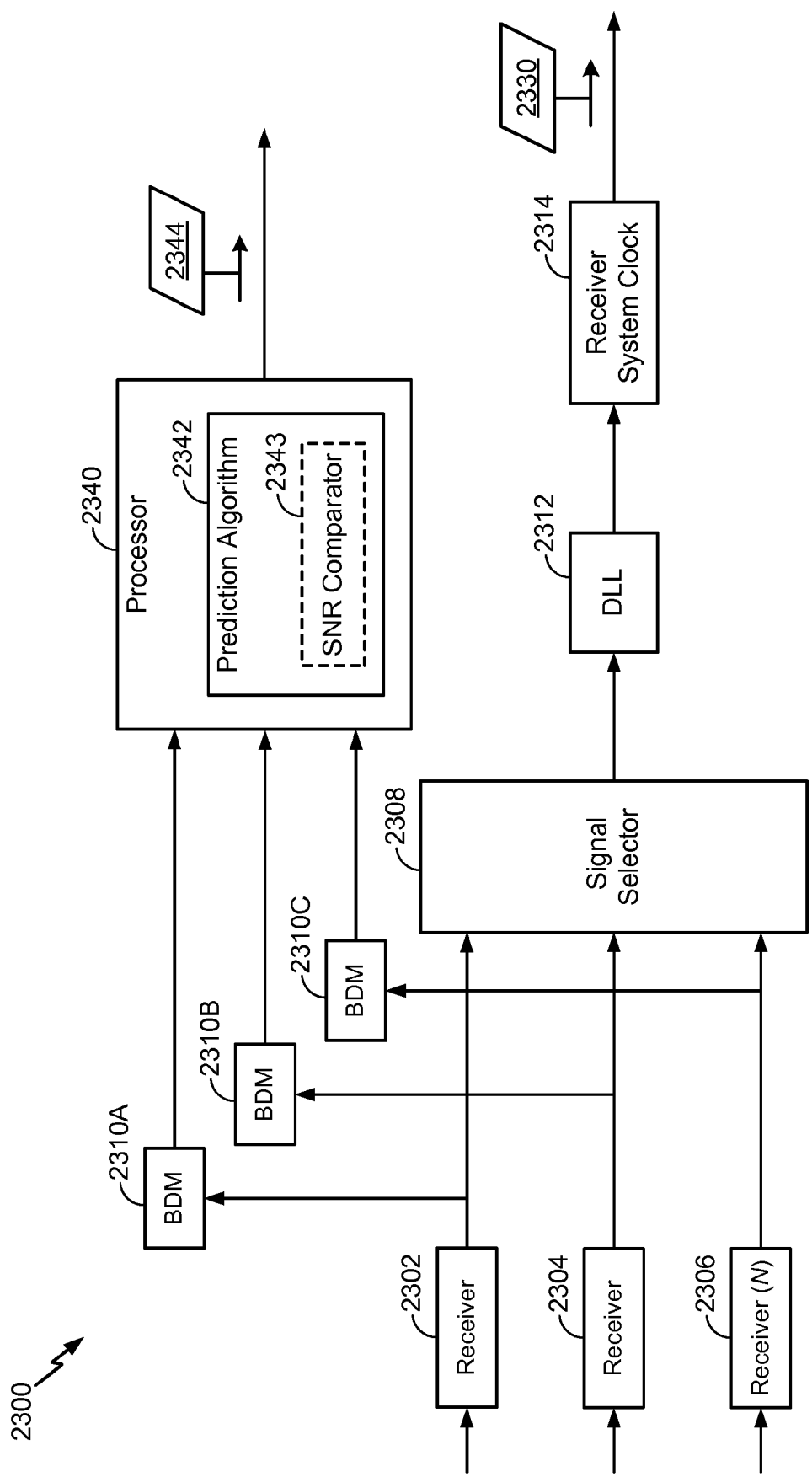
FIG. 23 illustrates another embodiment of a system for predicting an expected blockage of a signal path of an ultrasound signal

Referring to FIG. 23, a block diagram of another embodiment of a system 2300 to synchronize a system clock signal with a clock signal associated with a source of a received signal is shown. As shown in FIG. 23, the system includes multiple receivers (e.g., receiver 2302-receiver (N) 2306). As shown in FIG. 23, each of the receivers 2302-2306 may be coupled to a BDM 2310. For example, the receiver 2302 is coupled to a BDM 2310A, the receiver 2304 is coupled to a BDM 2310B, and the receiver (N) 2306 is coupled to a BDM 2310C. As shown in FIG. 23, each of the BDMs 2310 may be coupled to a processor 2340 and to a signal selector 2308. The signal selector 2308 is configured to receive signal data from each of the receivers 2302-2306 and to identify a particular selected receiver of the receivers 2302-2306 with a lowest output value. To illustrate, the signal selector may include one or more DLLs or PLLs and may determine an output (e.g., a discriminator output or a phase output) associated with each of the receivers 2302-2306. The signal selector 2308 may identify the particular selected receiver based on the outputs of the receivers and may provide a signal corresponding to the signal received at the particular selected receiver to a delay locked loop (DLL) 2312. The DLL 2312 may provide an output to a receiver system clock 2314, and the output may be used by the receiver system clock 2314 to synchronize a system clock signal 2330 (e.g., the clock signal 150 of FIG. 1) with a clock signal of the source of the signal (e.g., clock signal 206 of FIG. 2). The synchronized clock signals may be used to perform time difference of arrival calculations to determine a location of a source of the received signal.

As shown in FIG. 23, the outputs of the BDMs 2310 may be provided to the processor 2340. The processor 2340 may execute a prediction algorithm 2342 (e.g., the prediction algorithm 912 of FIG. 9). In response to executing the prediction algorithm 2342, the processor 2340 may generate an output 2344 including a control signal (e.g., the control signal 960 of FIG. 9), an updated receiver configuration (e.g., the configuration data 914 of FIG. 9), or both. In a particular embodiment, the prediction algorithm 2342 may generate the output 2344 based on a comparison of SNR values generated by the BDMs 2310 using a SNR comparator 2343, as described with reference to FIG. 13.

Figure 24:
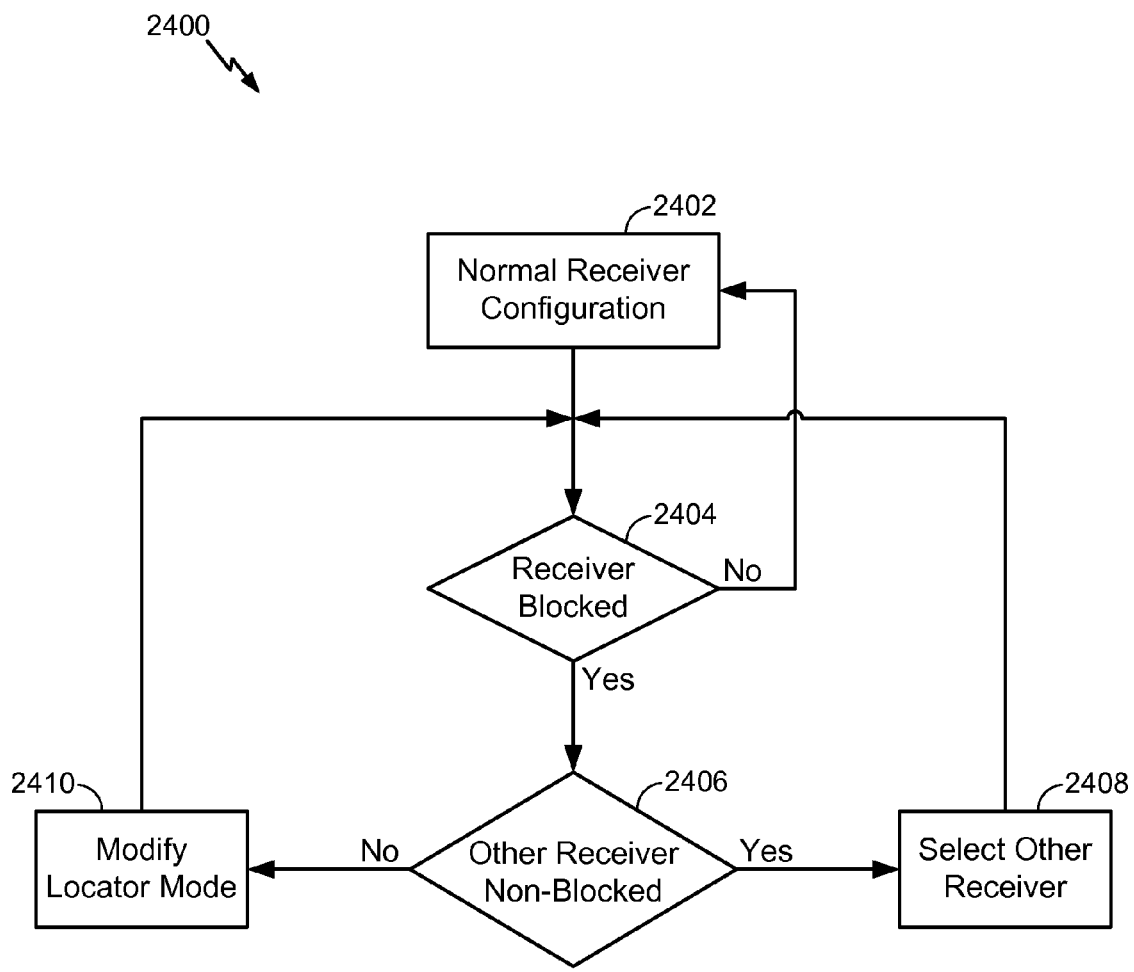
FIG. 24 is a flowchart of another embodiment of a method for predicting an expected blockage of a signal path of a signal.

Referring to FIG. 24, a flowchart of another embodiment of a method for predicting an expected blockage of a signal path of a signal is shown. At 2402, the method 2400 includes placing a device (e.g., the device 102 of FIG. 1) in a normal (or default) receiver configuration. In an embodiment, the normal receiver configuration may be determined using a look-up table (such as the look-up table 108 of FIG. 1). When the device is using the normal receiver configuration, the device includes at least one non-selected receiver. At 2404, the method 2400 includes determining whether a selected receiver of the device is blocked. Determining whether the selected receiver is blocked may include predicting an expected blockage of a signal path between a source of a signal and the selected receiver. If the selected receiver is not blocked, the method 2400 returns to 2402. If the selected receiver is blocked or an expected blockage is otherwise predicted, the method 2400 includes, at 2406, determining whether the at least one non-selected receiver is blocked. If the non-selected receiver is not blocked, the method 2400 includes, at 2408, selecting the non-selected receiver. At 2408, the method 2400 may further include de-selecting the selected receiver that was predicted to be blocked at 2404. If the non-selected receiver is determined to be blocked or an expected blockage is otherwise predicted, the method 2400 may include modifying a mode (e.g., switching from a quadmic mode to a normal) of the device, at 2410.

For example, the device may be the device 102 of FIG. 1. In the normal receiver configuration, the device may be configured to determine a 3-dimensional (3D) location of the source of the signal. Accordingly, the device may maintain at least four selected receivers (e.g., a first set of receivers) that are able to receive the signal from the source (e.g., receivers that are not blocked). If one of the four selected receivers is determined to be blocked or an expected blockage is otherwise predicted, the device may select a non-selected receiver (e.g., a second set of receivers) in order to maintain a sufficient number of selected receivers to determine the 3D location of the source. If there are no non-blocked non-selected receivers, the device may operate with three selected receivers by modifying the mode of operation of the device. When operating with three selected receivers, the device may determine a 2D location of the source of the signal. Thus, a device implementing the method 2400 may be operable to dynamically switch between determining a 3D location of a signal source and a 2D location of the signal source based on a determination that one or more selected receivers are blocked. By maintaining at least one non-selected receiver, the device consumes less power than if all receivers are selected (i.e., used for determining the location of a source of a signal).

Figure 25:
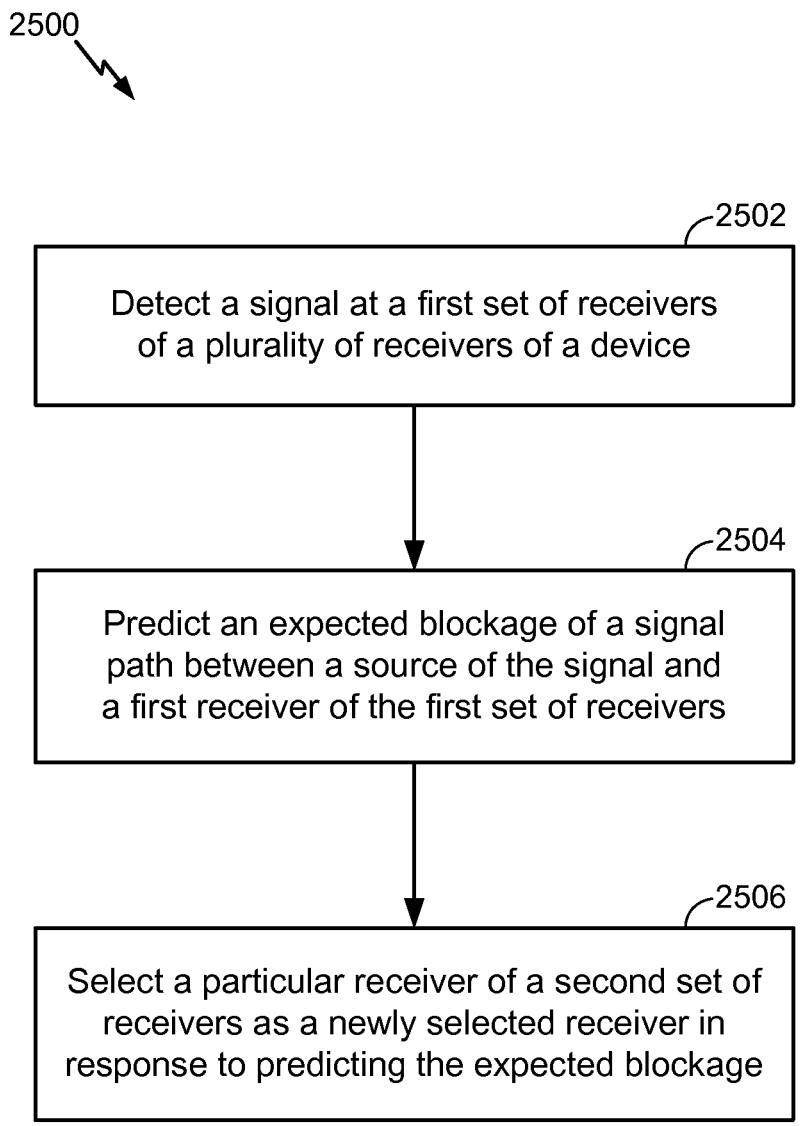
FIG. 25 is a flowchart of a method of selecting a non-selected receiver.

Referring to FIG. 25, a flowchart of a method 2500 of selecting a non-selected receiver is shown. The method 2500 includes, at 2502, detecting a signal at a first set of receivers of a plurality of receivers (e.g., the receivers 112-124 of FIG. 1) of a device (e.g., the device 100 of FIG. 1). The plurality of receivers includes the first set of receivers and a second set of receivers. The first set of receivers corresponds to selected receivers and the second set of receivers corresponds to non-selected receivers. At 2504, the method 2500 includes predicting, based on the signal, an expected blockage of a signal path between a source of the signal (e.g., the transmitter 204 of FIG. 2) and a first selected receiver of the first set of receivers. The method 2500 further includes, at 2506, selecting a particular receiver of the second set of receivers as a newly selected receiver in response to predicting the expected blockage. In a particular embodiment, two or more non-selected receivers (e.g., two or more receivers of the second set of receivers) may be selected in response to predicting the expected blockage, in response to determining that the source of the signal is located in a particular region, such as in a corner or at an edge of a device that includes the receivers, or both.

Figure 26:
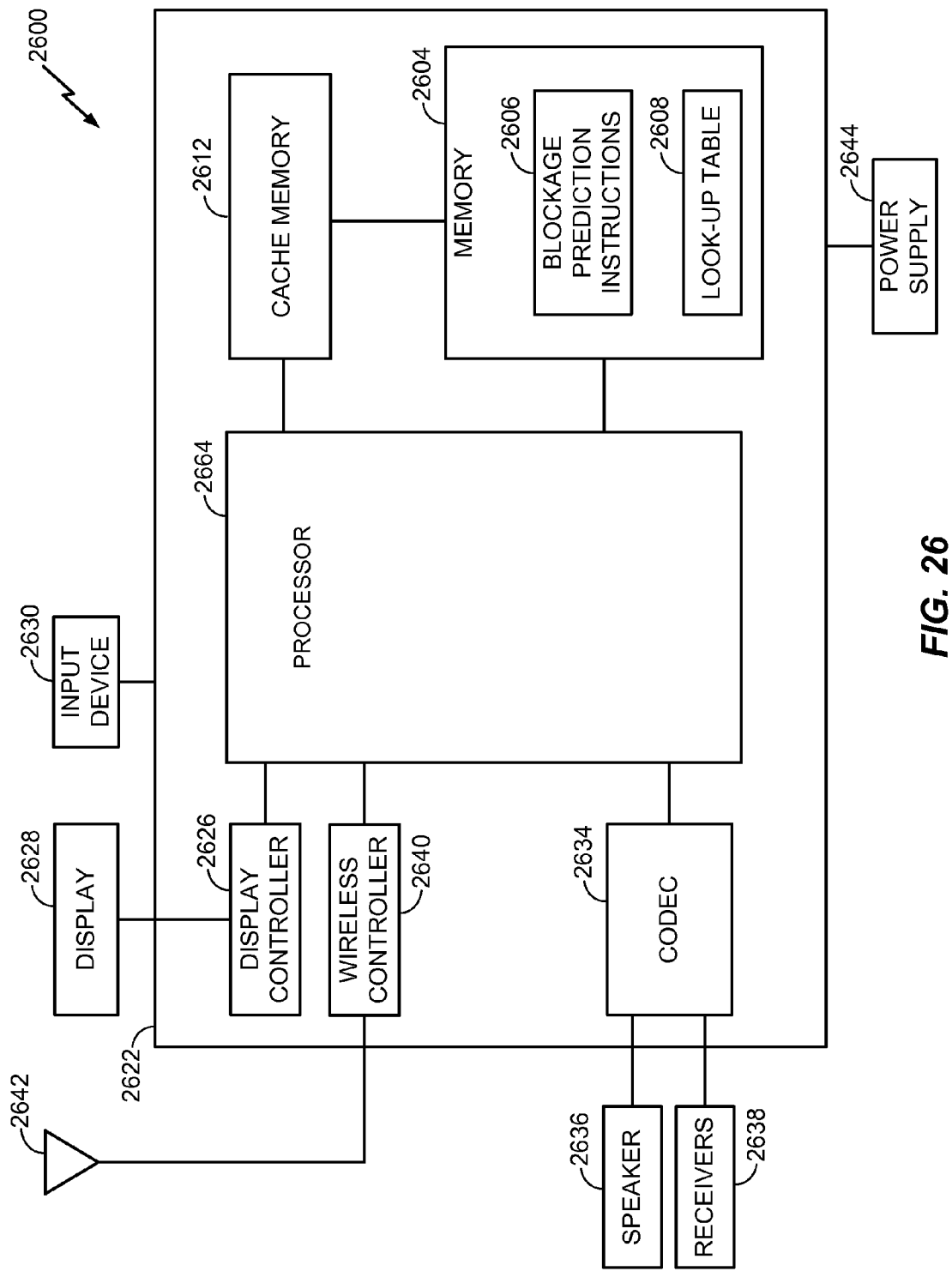
FIG. 26 is a block diagram of an illustrative embodiment of a computer system operable to support the various methods, systems, devices, and computer readable media described with respect to FIGS. 1-25.

Referring to FIG. 26, a block diagram of a computer system operable to support the various methods, systems, devices, and computer readable media described with respect to FIGS. 1-25 is shown. The device 2600 includes a processor 2664 coupled to a cache memory 2612 and to a memory 2604. The memory 2604 may store blockage prediction instructions 2606 and a look-up table 2608. The blockage prediction instructions 2606 may be executable by the processor 2664 to perform a method of predicting expected blockage of one or more active receivers, and in response to predicting the expected blockage, activating one or more inactive receivers.

FIG. 26 also shows a display controller 2626 that is coupled to the processor 2664 and to a display 2628. A coder/decoder (CODEC) 2634 can also be coupled to the processor 2664. A speaker 2636 and receivers 2638 can be coupled to the CODEC 2634.

FIG. 26 also indicates that a wireless controller 2640 can be coupled to the processor 2664 and to a wireless antenna 2642. In a particular embodiment, the processor 2664, the display controller 2626, the memory 2604, the CODEC 2634, and the wireless controller 2640 are included in a system-in-package or system-on-chip device 2622. In a particular embodiment, an input device 2630 and a power supply 2644 are coupled to the system-on-chip device 2622. Moreover, in a particular embodiment, as illustrated in FIG. 26, the display 2628, the input device 2630, the speaker 2636, the receivers 2638, the wireless antenna 2642, and the power supply 2644 are external to the system-on-chip device 2622. However, each of the display 2628, the input device 2630, the speaker 2636, the receivers 2638, the wireless antenna 2642, and the power supply 2644 can be coupled to a component of the system-on-chip device 2622, such as an interface or a controller.

It should be noted that although FIG. 26 depicts a wireless communications device, the processor 2664 and the memory 2604 may also be integrated into other electronic devices, such as a set top box, a music player, a video player, an entertainment unit, a navigation device, a personal digital assistant (PDA), a fixed location data unit, or a computer.

In conjunction with the described embodiments, a system is disclosed that is configured to perform receiver switching (e.g., selecting receivers and de-selecting receivers) based on signals received at the system from a signal source. The system may include multiple receiving means for receiving the signals. In an embodiment, the multiple receiving means may correspond to receivers, such as the receivers 110 of FIG. 1 or the receivers 302-314 of FIGS. 3A-7D. In another embodiment, the multiple receiving means may include multiple microphones, as described with reference to FIG. 3. The multiple receiving means may include a first set of receiving means and a second set of receiving means. The first set of receiving means may correspond to selected receiving means and the second set of receiving means may correspond to non-selected receiving means. The system includes means for predicting, based on a received signal, an expected blockage of a signal path between a source of the received signal and a first receiving means of the first set of receiving means. In a particular embodiment, the means for predicting may be a processor, such as the processor 102 of FIG. 1 or the processor 902 of FIG. 9. The system includes means for selecting a particular receiving means of the second set of receiving means as a newly selected receiving means in response to predicting the expected blockage. In a particular embodiment, the means for selecting may be a processor, such as the processor 102 of FIG. 1 or the processor 902 of FIG. 9. In a particular embodiment, the multiple receiving means, the means for predicting, and the means for selecting may collectively or individually be implemented by a field-programmable gate array (FPGA) device, an application-specific integrated circuit (ASIC), a processing unit such as a central processing unit (CPU), a digital signal processor (DSP), a controller, another hardware device, a firmware device, or any combination thereof configured to perform receiver switching based on the received signals.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g. tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
    detecting a signal at a first set of receivers of a plurality of receivers of a device, the plurality of receivers including the first set of receivers and a second set of receivers, wherein the first set of receivers corresponds to selected receivers and wherein the second set of receivers corresponds to non-selected receivers;
    predicting, based on the signal, an expected blockage of a signal path between a source of the signal and a first receiver of the first set of receivers; and
    selecting a particular receiver of the second set of receivers as a newly selected receiver in response to predicting the expected blockage of the signal path.

2. The method of claim 1, wherein the source comprises an ultrasound transmitter, and wherein the signal comprises an ultrasound signal.

3. The method of claim 1, further comprising:
    predicting a travel path of the source of the signal in response to predicting the expected blockage of the signal path; and
    determining the particular receiver of the second set of receivers based on the predicted travel path of the source of the signal.

4. The method of claim 3, wherein the particular receiver is selected from a look-up table based on information related to other receivers of the first set of receivers, based on information regarding the predicted travel path, based on information regarding a location of the source, or any combination thereof.

5. The method of claim 1, wherein the particular receiver of the second set of receivers is selected before the signal path is blocked.

6. The method of claim 1, wherein the expected blockage is a result of movement of the source of the signal, movement of an object, or any combination thereof.

7. The method of claim 3, further comprising predicting an expected blockage of the first receiver in response to predicting the expected blockage of the signal path, wherein predicting the expected blockage of the first receiver comprises:
    calculating a signal-to-noise ratio (SNR) value associated with the first receiver; and
    determining whether the SNR value is less than or equal to an SNR threshold.

8. The method of claim 3, further comprising predicting an expected blockage of the first receiver in response to predicting the expected blockage of the signal path, wherein predicting the expected blockage of the first receiver comprises:
    calculating a phase output of a phase-locked loop (PLL) associated with the first receiver; and
    determining whether the phase output is greater than or equal to an output threshold.

9. The method of claim 1, further comprising de-selecting the first receiver in response to predicting the expected blockage.

10. The method of claim 9, wherein the first receiver is de-selected before the signal path is blocked.

11. The method of claim 1, wherein the source is located at a location that is not bounded by the plurality of receivers.

12. The method of claim 1, wherein the source comprises a pen device including a transmitter that generates the signal.

13. The method of claim 1, further comprising determining a location of the source of the signal based on a time difference of arrival, at two or more receivers of the first set of receivers, of the signal.

14. The method of claim 13, further comprising selecting two or more receivers of the second set of receivers in response to predicting the expected blockage and in response to determining that the location of the source is within a particular region.

15. The method of claim 1, further comprising:
    after selecting the particular receiver as the newly selected receiver, determining whether a second signal path between the source and the newly selected receiver is blocked; and
    when the second signal path is determined to be blocked, activating another particular receiver of the second set of receivers as a second selected receiver and de-selecting the newly selected receiver.

16. An apparatus comprising:
    a plurality of receivers including a first set of receivers and a second set of receivers;
    a processor; and
    a memory configured to store instructions executable by the processor to:
        receive one or more signals from the first set of receivers, wherein the first set of receivers corresponds to selected receivers, and wherein the one or more signals received from the first set of receivers are indicative of acoustic signals detected by the first set of receivers;
        predict, based on the one or more signals, an expected blockage of a signal path between a source of the acoustic signals detected by the first set of receivers and a first receiver of the first set of receivers; and
        select at least one receiver of the second set of receivers in response to a prediction that the signal path is blocked, wherein the second set of receivers corresponds to non-selected receivers.

17. The apparatus of claim 16, wherein the source of the acoustic signals comprises a transmitter of a pen configured to write on a surface, and wherein the acoustic signals have a frequency in excess of twenty (20) kiloHertz (kHz).

18. The apparatus of claim 17, wherein the instructions are further executable by the processor to detect a state of the pen based on at least one of the one or more signals received from the first set of receivers, wherein the pen has a first state when the pen is operational but not writing and a second state with the pen is operational and writing.

19. The apparatus of claim 16, wherein the plurality of receivers includes at least one microphone configured to detect the acoustic signals, and wherein the acoustic signals are outside a human auditory range.

20. The apparatus of claim 16, wherein the instructions are further executable by the processor to generate a first clock signal based on the one or more signals received from the first set of receivers, and wherein the plurality of receivers are synchronized based on the first clock signal.

21. The apparatus of claim 16, wherein the memory further stores a look-up table, and wherein the instructions are further executable by the processor to select the at least one receiver of the second set of receivers based at least in part on the look-up table.

22. The apparatus of claim 16, wherein the plurality of receivers comprises a plurality of microphones configured to detect the acoustic signals and to generate the one or more signals to enable the processor to estimate a distance and a direction to the source of the acoustic signals based on a time difference of arrival of the acoustic signals at a set of microphones of the plurality of microphones, wherein the set of microphones corresponds to the first set of receivers.

23. The apparatus of claim 16, wherein the plurality of receivers, the processor, and the memory are integrated into one of a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, and a navigation device.

24. The apparatus of claim 16, wherein the plurality of receivers includes at least one microphone configured to detect the acoustic signals, and wherein first acoustic signals of the acoustic signals are inside a human auditory range and second acoustic signals of the acoustic signals are outside of the human auditory range.

25. A non-transitory computer-readable medium comprising instructions executable by a processor to cause the processor to perform operations including:
receiving one or more signals from a first set of receivers of a plurality of receivers of a device, the plurality of receivers including the first set of receivers and a second set of receivers, wherein the first set of receivers correspond to selected receivers, wherein the second set of receivers correspond to non-selected receivers, and wherein the one or more signals received from the first set of receivers are indicative of acoustic signals detected by the first set of receivers;
predicting, based on the one or more signals, an expected blockage of a signal path between a source of the acoustic signals and a first receiver of the first set of receivers; and
selecting a particular receiver of the second set of receivers as a newly selected receiver in response to predicting the expected blockage of the signal path.

26. The non-transitory computer-readable medium of claim 25, wherein the plurality of receivers includes at least one microphone.

27. The non-transitory computer-readable medium of claim 25, wherein the plurality of receivers includes at least one microphone configured to detect first acoustic signals of the acoustic signals, the first acoustic signals having a frequency in excess of twenty (20) kiloHertz (kHz), and at least one microphone configured to detect second acoustic signals of the acoustic signals, the second acoustic signals having a frequency between twenty (20) Hertz (Hz) and twenty (20) kHz.

28. The non-transitory computer-readable medium of claim 25, wherein the operations further comprise:
predicting a travel path of the source of the acoustic signals in response to predicting the expected blockage of the signal path; and
selecting the particular receiver of the second set of receivers based on the predicted travel path of the source of the acoustic signals.

29. The non-transitory computer-readable medium of claim 28, wherein the particular receiver is selected from a look-up table based on information related to the first set of receivers, based on information regarding the predicted travel path, based on information regarding a location of the source, or any combination thereof.

30. The non-transitory computer-readable medium of claim 25, wherein the operations further comprise de-selecting the first receiver in response to predicting the expected blockage.

31. An apparatus comprising:
multiple receiving means for receiving one or more signals, the multiple receiving means including a first set of means for detecting acoustic signals and a second set of means for detecting the acoustic signals, wherein the first set of means for detecting the acoustic signals correspond to selected means for detecting the acoustic signals, wherein the second set of means for detecting the acoustic signals correspond to non-selected means for detecting the acoustic signals, and wherein the one or more signals are indicative of the acoustic signals detected by the first set of means for detecting;
means for predicting, based on the one or more signals, an expected blockage of a signal path between a source of the acoustic signals and a first means for detecting the acoustic signals of the first set of means for detecting the acoustic signals; and
means for selecting a particular means for detecting the acoustic signals of the second set of means for detecting the acoustic signals as a newly selected means for detecting the acoustic signals in response to a prediction that the signal path is blocked.

32. The apparatus of claim 31, wherein the multiple receiving means, the means for predicting, and the means for selecting are integrated in a computer.

33. The apparatus of claim 31, wherein the multiple receiving means, the means for predicting, and the means for selecting are integrated in a mobile communication device.

34. The apparatus of claim 31, wherein the multiple receiving means comprise a plurality of microphones, wherein at least one microphone of the plurality of microphones is configured to detect ultrasound signals, and wherein the acoustic signals correspond to the ultrasound signals.

35. The apparatus of claim 31, further comprising means for de-selecting the first means for detecting the acoustic signals in response to predicting the expected blockage.

36. The apparatus of claim 31, further comprising means for determining a location of the source of the acoustic signals based on a time difference of arrival of the acoustic signals at two or more means for detecting the acoustic signals of the first set of means for detecting the acoustic signals.

37. The apparatus of claim 31, further comprising:
means for predicting a travel path of the source based on the one or more signals; and
means for determining the particular means for detecting the acoustic signals of the second set of means for detecting the acoustic signals based on the predicted travel path of the source.

38. The apparatus of claim 31, wherein the multiple receiving means includes at least one microphone configured to detect detect first acoustic signals of the acoustic signals, the first acoustic signals having a frequency in excess of twenty (20) kiloHertz (kHz), and to detect second acoustic signals of the acoustic signals, the second acoustic signals having a frequency between twenty (20) Hertz (Hz) and twenty (20) kHz.

39. The method of claim 1, wherein the particular receiver is selected in response to predicting an expected blockage of the first receiver, and wherein selecting the particular receiver of the second set of receivers as the newly selected receiver comprises:
determining a first value associated with a first non-selected receiver of the second set of receivers, wherein the first value is associated with a signal-to-noise (SNR) value; and
determining a second value associated with a second non-selected receiver of the second set of receivers, wherein the second value is associated with a discriminator output of a delay locked loop (DLL) or a phase output of a phase-locked loop (PLL), wherein the particular receiver is selected as the newly selected receiver based on the first value and the second value.

40. The method of claim 39, wherein predicting the expected blockage of the first receiver comprises:
receiving tracing direction data at a processor from a gesture algorithm unit, the tracing direction data indicative of a direction of travel of the source of the signal; and
receiving configuration data at the processor from a memory, the configuration data indicative of selection states of the first set of receivers and the second set of receivers, wherein the expected blockage of the first receiver is predicted based on the tracing direction data and the configuration data.

41. The method of claim 1, wherein the expected blockage of the signal path predicted is based on a signal-to-noise (SNR) value, a discriminator output of a delay locked loop (DLL), a phase output of a phase-locked loop (PLL), or a combination thereof, associated with the first receiver.

* * * * *